US011281435B2

(12) United States Patent
Taniguchi

(10) Patent No.: US 11,281,435 B2
(45) Date of Patent: Mar. 22, 2022

(54) APPLICATION DEVELOPMENT ENVIRONMENT PROVIDING SYSTEM, APPLICATION DEVELOPMENT ENVIRONMENT PROVISION METHOD, TERMINAL DEVICE, AND APPLICATION DISPLAY METHOD

(71) Applicant: Yokogawa Electric Corporation, Tokyo (JP)

(72) Inventor: Koichi Taniguchi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 16/336,996

(22) PCT Filed: Aug. 31, 2017

(86) PCT No.: PCT/JP2017/031477
§ 371 (c)(1),
(2) Date: Mar. 27, 2019

(87) PCT Pub. No.: WO2018/061605
PCT Pub. Date: Apr. 5, 2018

(65) Prior Publication Data
US 2019/0220255 A1 Jul. 18, 2019

(30) Foreign Application Priority Data
Sep. 30, 2016 (JP) .............................. JP2016-193842

(51) Int. Cl.
*G06F 8/34* (2018.01)
*H04L 12/58* (2006.01)
(Continued)

(52) U.S. Cl.
CPC .................. *G06F 8/34* (2013.01); *G06F 8/70* (2013.01); *G06F 9/44* (2013.01); *H04L 51/04* (2013.01)

(58) Field of Classification Search
CPC .......... G06F 8/20; G06F 8/30; G06F 8/33–36; G06F 8/70; G06F 9/44; H04L 51/04
(Continued)

(56) References Cited

U.S. PATENT DOCUMENTS 7,340,721 B1* 3/2008 Bailey ...................... G06F 8/34
717/109
8,060,855 B2* 11/2011 Hegde ...................... G06F 8/71
717/103
(Continued)

FOREIGN PATENT DOCUMENTS

JP 2008-533549 A 8/2008
JP 2012-523038 A 9/2012
(Continued)

OTHER PUBLICATIONS

Peter Mell et al., "The NIST Definition of Cloud Computing", NIST, Special Publication 800-145, Sep. 2011, 15 pages, https://www.ipa.go.jp/files/000025366.pdf.
(Continued)

*Primary Examiner* — Andrew M. Lyons
(74) *Attorney, Agent, or Firm* — Sughrue Mion, PLLC

(57) ABSTRACT

An application development environment providing system which provides a development environment for an application program via a network, the application development environment providing system includes a program developer configured to generate the application program on the basis of an input from a terminal connected to the development environment, and to visually display the generated application program, and a communicator configured to
(Continued)

provide a communication function among a plurality of users who use the development environment, to copy a part or all of the application program generated by the program developer in the development environment used by a first user to be available in the development environment used by a second user, and to visually display the part or all of the application program.

19 Claims, 14 Drawing Sheets

(51) Int. Cl.
*G06F 8/70* (2018.01)
*G06F 9/44* (2018.01)
*H04L 51/04* (2022.01)

(58) Field of Classification Search
USPC ........ 717/101, 103, 105, 107, 109, 113, 120
See application file for complete search history.

(56) References Cited

U.S. PATENT DOCUMENTS

| | | | | |
|---|---|---|---|---|
| 9,170,784 | B1* | 10/2015 | Friedman | G06F 8/30 |
| 9,652,225 | B1* | 5/2017 | Bohn | G06F 16/00 |
| 2006/0150144 | A1* | 7/2006 | Balathandapani | G06F 8/20 |
| | | | | 717/106 |
| 2008/0125877 | A1* | 5/2008 | Miller | G05B 15/02 |
| | | | | 700/29 |
| 2008/0134298 | A1* | 6/2008 | Nathan | G06F 8/20 |
| | | | | 726/4 |
| 2008/0228774 | A1* | 9/2008 | Hamilton | G06Q 10/10 |
| 2008/0244418 | A1* | 10/2008 | Manolescu | G06Q 10/00 |
| | | | | 715/753 |
| 2009/0094572 | A1* | 4/2009 | Hegde | G06F 8/71 |
| | | | | 717/101 |
| 2010/0004010 | A1* | 1/2010 | Shin | H04L 51/04 |
| | | | | 455/466 |
| 2010/0257228 | A1* | 10/2010 | Staggs | G06F 9/5027 |
| | | | | 709/203 |
| 2012/0117541 | A1* | 5/2012 | Bates | G06F 11/362 |
| | | | | 717/125 |
| 2013/0086551 | A1* | 4/2013 | Archer | G06F 8/34 |
| | | | | 717/113 |
| 2013/0218867 | A1* | 8/2013 | De | G06F 8/71 |
| | | | | 707/722 |
| 2014/0278312 | A1* | 9/2014 | Nixon | G06F 9/44505 |
| | | | | 703/6 |
| 2014/0289391 | A1 | 9/2014 | Balaji et al. | |
| 2014/0310678 | A1* | 10/2014 | Howard | G06F 8/34 |
| | | | | 717/100 |
| 2015/0032686 | A1* | 1/2015 | Kuchoor | G06Q 10/101 |
| | | | | 707/608 |
| 2015/0051930 | A1 | 2/2015 | Yamaguchi et al. | |
| 2016/0004529 | A1* | 1/2016 | Xia | G06F 8/654 |
| | | | | 717/178 |
| 2016/0092336 | A1* | 3/2016 | Atanasiu | G06F 11/323 |
| | | | | 717/133 |
| 2016/0224337 | A1* | 8/2016 | Xia | G06F 8/71 |
| 2017/0003862 | A1* | 1/2017 | Mital | G06F 3/04847 |
| 2017/0083292 | A1* | 3/2017 | McLaughlan | G06F 8/60 |
| 2017/0097822 | A1* | 4/2017 | DeLuca | G06F 8/71 |
| 2017/0201551 | A1* | 7/2017 | Tripepi | H04L 65/403 |
| 2017/0322781 | A1* | 11/2017 | Schreder | G06F 8/33 |

FOREIGN PATENT DOCUMENTS

| | | |
|---|---|---|
| JP | 5792891 B2 | 10/2015 |
| WO | 2010/120440 A2 | 10/2010 |

OTHER PUBLICATIONS

Kota Uchida et al., "Conditions and the outlook for C-Helper, a tool for C novices", The 54th Programming/Symposium, Jan. 11, 2013, pp. 153-160, vol. 2013.
International Search Report for PCT/JP2017/031477, dated Nov. 28, 2017.

* cited by examiner

| REFRIGERATOR | PERFORMANCE COEFFICIENT |
|---|---|
| 1 | 0.32 |
| 2 | 0.24 |
| 3 | 0.28 |
| 4 | 0.11 |
| 5 | 0.08 |
| 6 | 0.09 |

APPLICATION DEVELOPMENT ENVIRONMENT PROVIDING SYSTEM, APPLICATION DEVELOPMENT ENVIRONMENT PROVISION METHOD, TERMINAL DEVICE, AND APPLICATION DISPLAY METHOD

CROSS REFERENCE TO RELATED APPLICATIONS

This Application is a National Stage of International Application No. PCT/JP2017/031477 filed Aug. 31, 2017, claiming priority based on Japanese Patent Application No. 2016-193842 filed Sep. 30, 2016.

TECHNICAL FIELD

The present invention relates to an application development environment providing system, an application development environment provision method, a terminal device, and an application display method.

BACKGROUND ART

In a plant, a factory, or the like, a distributed control system (DCS) in which field devices (measurement devices and operating devices) and a control device that controls the field devices are connected via communication means is constructed, and advanced automatic operation is realized. In a plant in which such an advanced automatic operation is realized, various systems (engineering systems) such as a manufacturing execution system (MES), a plant information management system (PIMS), and an enterprise resource planning (ERP) system are often constructed, in addition to the distributed control system.

Most of these engineering systems are realized by using devices installed in a plant such as a programmable logic controller (PLC), a factory automation (FA) computer, a general-purpose desktop computer, or a server device. In recent years, with the progress of communication technology, some of the engineering systems are realized by cloud computing via a network.

Here, the cloud computing may conform to a definition described in a document specified by the following URL (Uniform Resource Locator) (a definition recommended by the US National Institute of Standards and Technology).

http://nvlpubs.nist.gov/nistpubs/Legacy/SP/nistspecialpublication800-145.pdf https://www.ipa.go.jp/files/000025366.pdf Patent literature 1 below discloses cloud computing for an industrial automation and production system. Patent literature 2 below discloses an example of a technology for providing, through cloud computing, a development environment for developing an application program to be used in a cloud computing environment.

CITATION LIST

Patent Literature

[Patent Literature 1] Japanese Unexamined Patent Application Publication (Translation of PCT Application) No. 2012-523038

[Patent Literature 2] Japanese Patent No. 5792891

SUMMARY OF INVENTION

Technical Problem

The system that provides the development environment disclosed in, for example, Patent literature 2 described above is used at various enterprises (tenants). For example, in a case in which development of an engineering system that is realized at a plant is performed, the system that provides the development environment is used by a customer (for example, an orderer), an engineering company (for example, a contractor), and a third vendor (a third party).

In such a system that provides a development environment to be used by various affiliated enterprises, an application developer who is a user of the relevant system may desire to share an application program being developed for joint development of an application with developers of other enterprises. Further, the application developer may desire to acquire an application program, including setting information of parameter values or the like set by a client enterprise in order to maintain the application provided to the client enterprise, from a customer.

In a system that provides a development environment of the related art, when an application program developed by the system is shared with other users, it is necessary to transmit and receive the application program by separately using another system different from a system that provides a development environment of the application program, and share the application program.

In this case, for example, there is a problem that it is difficult to share a flexible application program so that only a specific range of the application program is designated and a part of the application program is partially provided. There is also a problem that efficiency of communication between users may be degraded due to differences between a system for developing an application program and a system for sharing the application program with other users.

Solution to Problem (1) An aspect of the present invention is an application development environment providing system which provides a development environment for an application program via a network, the application development environment providing system includes a program developer configured to generate the application program on the basis of an input from a terminal connected to the development environment, and to visually display the generated application program, and a communicator configured to provide a communication function among a plurality of users who use the development environment, to copy a part or all of the application program generated by the program developer in the development environment used by a first user to be available in the development environment used by a second user, and to visually display the part or all of the application program.

(2) An aspect of the present invention is the application development environment providing system according to (1), wherein the communicator is configured to copy the part of the application program to be available on the basis of selected region information which represents a selected region of the application program selected in accordance with an operation of a user by the program developer, and to visually display the part of the application program.

(3) An aspect of the present invention is the application development environment providing system according to (1)

or (2), wherein the communicator is configured to copy the part or all of the application program comprising parameter information set by the program developer to be available.

(4) An aspect of the present invention is the application development environment providing system according to any one of claims (1) to (3), wherein the program developer is configured to copy the part or all of the application program displayed by the communicator to be available, and to visually display the part or all of the application program.

(5) An aspect of the present invention is the application development environment providing system according to (4), wherein the program developer is configured to update the displayed application program on the basis of an input from the terminal.

(6) An aspect of the present invention is the application development environment providing system according to any one of (1) to (5), wherein the program developer is configured to copy the application program to be available on the basis of at least one of development parts information representing development parts comprising input, calculation, or output, layout information representing an arrangement of the development parts, connection information representing a logical connection between the development parts, and parameter information representing a parameter value set to the development parts, and to visually display the application program.

(7) An aspect of the present invention is the application development environment providing system according to any one of (1) to (6), wherein the communicator is configured to visually move the part or all of the application program generated by the program developer from the program developer to the communicator in accordance with an operation of dragging and dropping by a user to copy the part or all of the application program to be available in the designated terminal, and to visually display the part or all of the application program.

(8) An aspect of the present invention is the application development environment providing system according to any one of (1) to (7), wherein the communicator is configured to provide the communication function among the plurality of users by a display form in a chat format.

(9) An aspect of the present invention is an application development environment provision method of providing a development environment for an application program via a network, the application development environment provision method includes generating, by a program developer, the application program on the basis of an input from a terminal connected to the development environment, visually displaying, by the program developer, the application program which has been generated, providing, by a communicator, a communication function among a plurality of users who use the development environment, copying, by the communicator, a part or all of the application program which has been generated to be available in a designated terminal, and visually displaying, by the communicator, the part or all of the application program which has been copied.

(10) An aspect of the present invention is a non-transitory computer readable storage medium storing one or more programs configured for execution by a computer, the one or more programs comprising instructions for generating an application program on the basis of an input from a terminal connected to a development environment of the application program, visually displaying the application program which has been generated, providing a communication function among a plurality of users who use the development environment, copying, by the communicator, a part or all of the application program which has been generated to be available in a designated terminal, and visually displaying the part or all of the application program which has been copied.

(11) An aspect of the present invention is a terminal device which is communicably connected to a development environment for an application program provided via a network, the terminal device includes a program development display configured to visually display the application program generated via the development environment on the basis of an input from the terminal device, and a communication display configured to provide a communication function among a plurality of users who use the development environment, and to visually display a part or all of the application program generated in the development environment used by a first user on the development environment used by a second user.

(12) An aspect of the present invention is the terminal device according to (11), wherein the communication display is configured to visually display the part of the application program on the basis of selected region information which represents a selected region of the application program selected in accordance with an operation of a user via the program development display.

(13) An aspect of the present invention is the terminal device according to (11) or (12), wherein the communication display is configured to visually display the part or all of the application program comprising parameter information set via the program development display.

(14) An aspect of the present invention is the terminal device according to any one of (11) to (13), wherein the program development display is configured to visually display the part or all of the application program displayed by the communication display.

(15) An aspect of the present invention is the terminal device according to (14), wherein if the displayed application program has been updated on the basis of an input from the terminal device, the program development display is configured to visually display the updated application program.

(16) An aspect of the present invention is the terminal device according to any one of (11) to (15), wherein the program development display is configured to visually display the application program on the basis of at least one of development parts information representing development parts comprising input, calculation, or output, layout information representing an arrangement of the development parts, connection information representing a logical connection between the development parts, and parameter information representing a parameter value set to the development parts.

(17) An aspect of the present invention is the terminal device according to any one of (11) to (16), wherein the communication display is configured to visually move the part or all of the application program displayed by the program development display from the program development display to the communication display in accordance with an operation of dragging and dropping by a user to visually display the part or all of the application program in the designated terminal.

(18) An aspect of the present invention is the terminal device according to any one of (11) to (17), wherein the communication display is configured to display communication contents among the plurality of users by a display form in a chat format.

(19) An aspect of the present invention is an application display method performed by a terminal device communicably connected to a development environment for an application program provided via a network, the application display method includes visually displaying, by a program development display, the application program generated via the development environment on the basis of an input from the terminal device, providing, by a communication display, a communication function among a plurality of users who use the development environment, and visually displaying, by the communication display, a part or all of the application program generated in the development environment used by a first user on the development environment used by a second user.

(20) An aspect of the present invention is a non-transitory computer readable storage medium storing one or more programs configured for execution by a computer, the one or more programs comprising instructions for visually displaying the application program generated via a development environment on the basis of an input from a terminal device communicably connected to the development environment for an application program, providing a communication function among a plurality of users who use the development environment, and visually displaying a part or all of the application program generated in the development environment used by a first user on the development environment used by a second user.

Further features and aspects of the present disclosure will become apparent from the following detailed description of exemplary embodiments with reference to the attached drawings.

Advantageous Effects of Invention

According to the present invention, it is possible to realize efficient development and sharing of application programs.

DESCRIPTION OF EMBODIMENTS

Embodiments of the present invention will be described with reference to preferred embodiments. Those skilled in the art can achieve many alternatives to the embodiment using teachings of the present invention, and the present invention is not limited to the preferred embodiments described herein.

One aspect of the present invention is to provide an application development environment providing system, an application development environment provision method, a terminal device, an application display method, and a computer-readable non-transient recording medium, which are capable of realizing efficient development and sharing of application programs that are used in a cloud computing environment.

Embodiments

The present invention relates to a system (hereinafter referred to as an application development environment providing system) that performs a calculation process or the like using data transmitted from sensors, devices, systems, or the like connected to a communication network as input values in a cloud computing environment. This system is an architecture for providing a development environment for developing programs such as basic software, applications, and solutions of the Internet Of Things (IoT) or Industrial Internet Of Things (IIoT), and a system for realizing the architecture.

Hereinafter, basic software, applications, solutions, and the like are collectively referred to as applications. Further, programs such as basic software, applications, and solutions are collectively referred to as application programs.

In the following description, the application development environment is a development environment for developing programs such as the basic software, applications, and solutions of the IoT or IIoT, which perform a computation process or the like using data transmitted from sensors, devices, systems, and the like connected to the communication network as input values in the cloud computing environment.

In the following description, the application execution environment is an environment for executing programs such as the basic software, applications, and solutions of the IoT or IIoT, which perform a computation process or the like using data transmitted from sensors, devices, systems, and the like connected to the communication network as input values in the cloud computing environment.

(Overall Flow of Application Development)

An overall flow of application development using the application development environment providing system in order to make it easier to understand description of a functional configuration and operation of the application development environment providing system according to the embodiment to be described below will be described through a specific embodiment.

FIGS. 1 to 7 are schematic diagrams illustrating an example of application development in the application development environment providing system according to the embodiment.

Figure 1:
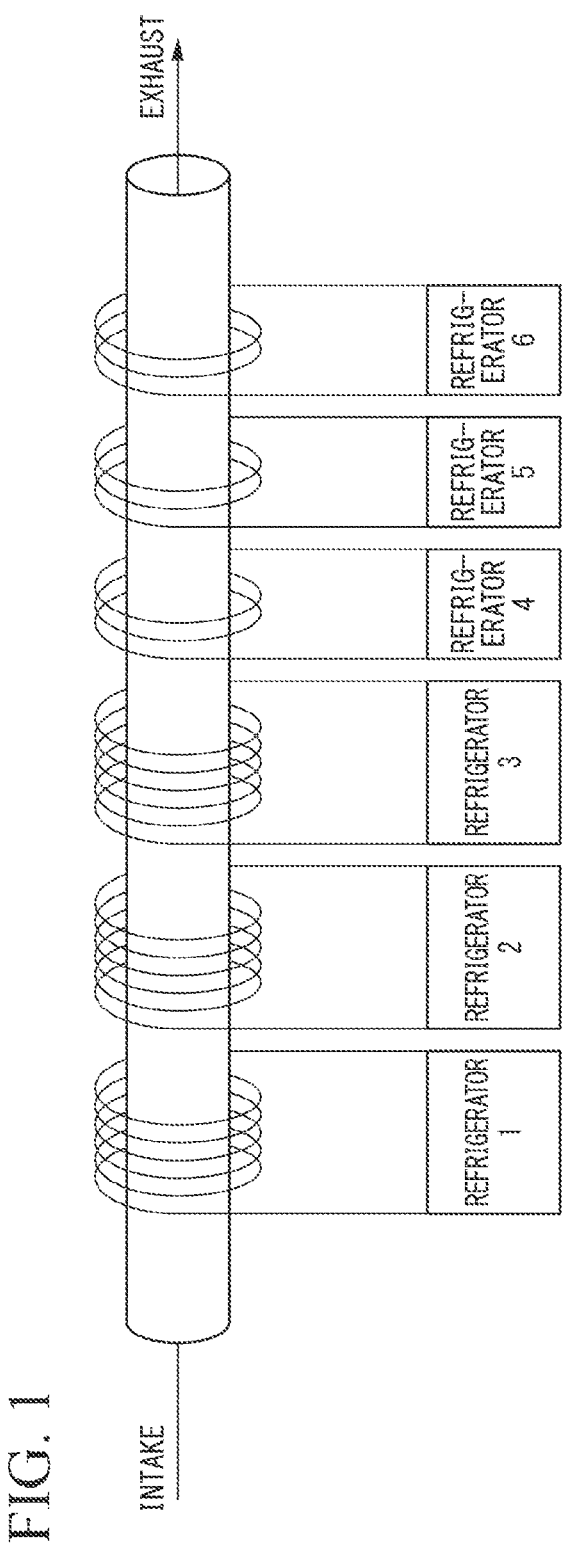
FIG. 1 is a schematic diagram illustrating an example of application development in an application development environment providing system according to an embodiment.

A case in which driving of six refrigerators having different capabilities is controlled in order to adjust a temperature of a gas that is exhausted from a pipe as illustrated in FIG. 1 will be described in the embodiment to be described below. A purpose is to minimize power consumption (output 2) by appropriately switching ON/OFF (inputs 7 to 8) of respective switches of the six refrigerators according to a variation in an intake gas temperature (input 1) in order to maintain an exhaust gas temperature (output 1) in the pipe to be below a certain level.

In the related art, switches of respective refrigerators are switched between ON and OFF according to the intuition and experience of an operator. However, in the application development environment providing system according to the embodiment, an efficient driving control pattern of the refrigerators is discovered, and an application in which an algorithm for automation of the driving control pattern is incorporated has been developed.

A developer who develops an application using the application development environment providing system first disposes development parts indicating an analysis element for multi-input two-output control on the design screen of the application that is displayed on the display of the application development environment providing system. The analysis element is a development part described as "Nx2" in FIG. 2.

Figure 2:
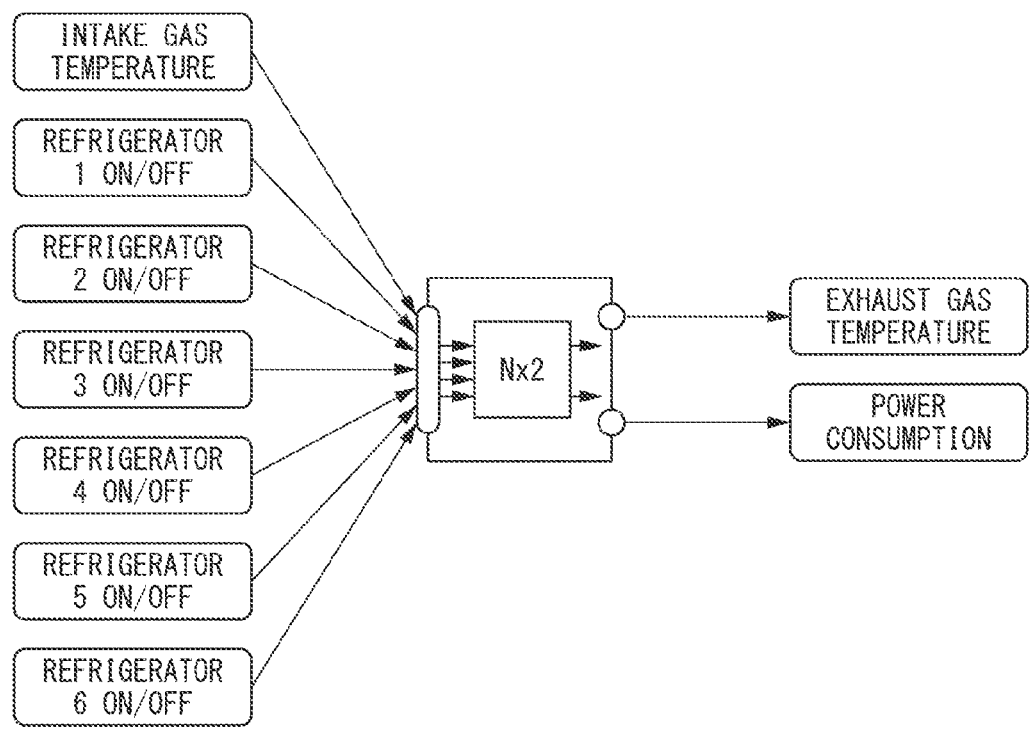
FIG. 2 is a schematic diagram illustrating an example of application development by the application development environment providing system according to the embodiment.

Next, the developer opens a historian (a database in which historical information or achievement information has been stored) and disposes development parts indicating seven input data items including "intake gas temperature", "refrigerator 1 ON/OFF", "refrigerator 2 ON/OFF", "refrigerator 3 ON/OFF", "refrigerator 4 ON/OFF", "refrigerator 5 ON/OFF", and "refrigerator 6 ON/OFF" on a design screen. Thereafter, as illustrated in FIG. 2, the developer connects the development parts indicating the seven input data items to an analysis element "Nx2".

Next, the developer disposes development parts showing two output data items of "exhaust gas temperature" and "power consumption" on the design screen from the historian. Thereafter, as illustrated in FIG. 2, the developer connects the development parts indicating the two output data items to the respective analysis elements of "Nx2". In this case, the developer designates past data for two years as past data of "exhaust gas temperature" and "power consumption" that are used for analysis.

Figure 3A:
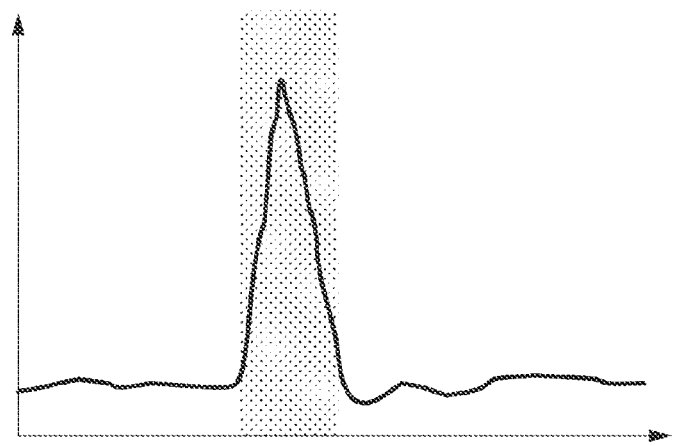
FIG. 3A is a schematic diagram illustrating an example of application development by the application development environment providing system according to the embodiment.
Figure 3B:
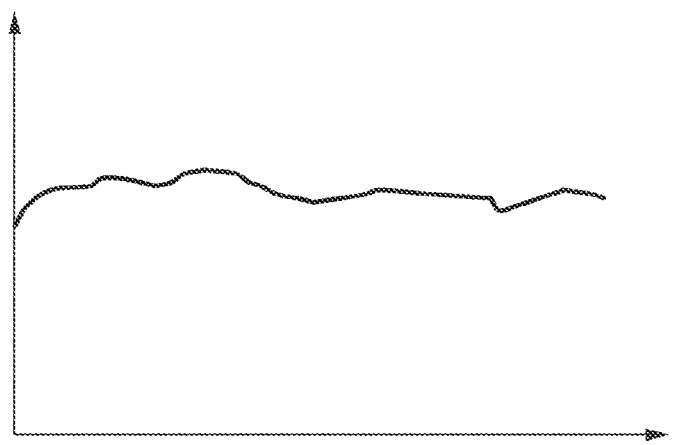
FIG. 3B is a schematic diagram illustrating an example of application development by the application development environment providing system according to the embodiment.

When the developer displays a detailed screen of the analysis element of "Nx2" on the design screen, a line graph as illustrated in FIGS. 3A and 3B, for example, is displayed. In the line graph illustrated in FIG. 3A, a vertical axis represents the exhaust gas temperature and a horizontal axis represents a past time axis. In the line graph illustrated in FIG. 3B, a vertical axis represents power consumption and a horizontal axis represents a past time axis.

In the graph illustrated in FIG. 3A, the presence of a time period in which the exhaust gas temperature has temporarily increased (has been an abnormal value) is shown, and a place corresponding to the time period is displayed in a band shape. The developer inquires about a customer (for example, an enterprise that controls the exhaust gas temperature in the pipe, which is an enterprise that has requested the developer to develop an application). The application development environment providing system includes a chat function (a communication function according to a display form in a chat format), an e-mail transmission and reception function, a call function, and the like as means of communicating with the customer. The developer first inquiries about the customer through the call function.

Through a call with the customer, the developer ascertains that facility renovation work has been performed in a time period in which the exhaust gas temperature has temporarily become high (has been abnormal value), and receives an instruction to exclude data in the time period from analysis targets from the customer. Using the chat function of the application development environment providing system, the developer acquires data indicating a precise time period that is excluded from analysis targets from the customer. The developer causes a screen for setting the analysis exclusion range to be displayed on the design screen, inputs the data indicating the precise time period that is excluded from analysis targets, and sets an analysis exclusion range. The developer inputs a comment acquired from the customer using the chat function, and attaches the comment to a place (a screen region) on which the setting has been performed in the screen on which an analysis exclusion range setting is performed.

Figure 4:
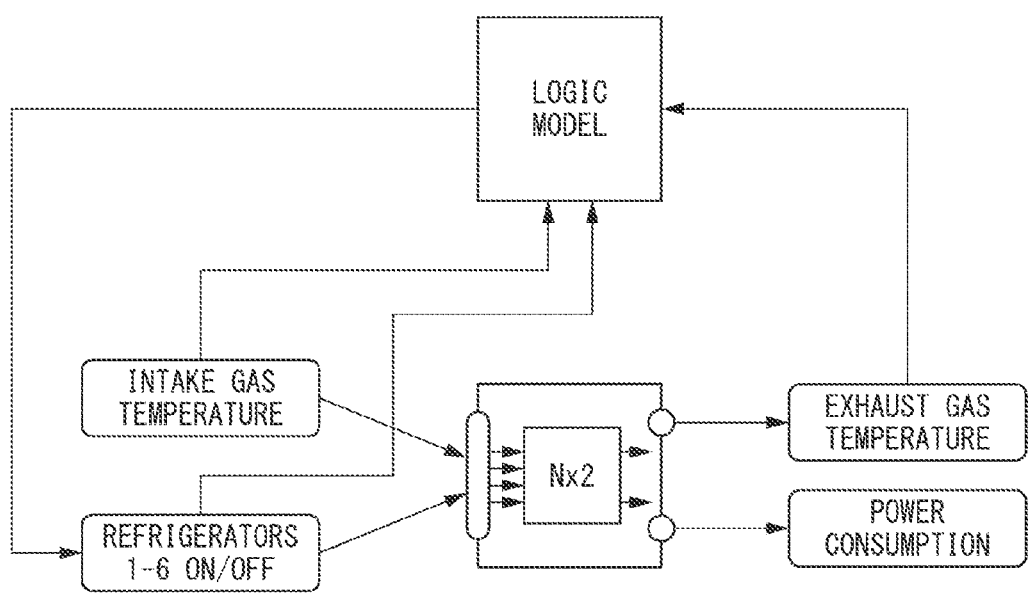
FIG. 4 is a schematic diagram illustrating an example of application development by the application development environment providing system according to the embodiment.

Next, on the design screen, the developer groups six input data items "refrigerator 1 ON/OFF", "refrigerator 2 ON/OFF", "refrigerator 3 ON/OFF", "refrigerator 4 ON/OFF", "refrigerator 5 ON/OFF", and "refrigerator 6 ON/OFF" into one and performs switching to a data input item "refrigerator 1-6 ON/OFF" as illustrated in FIG. 4.

Figures 5A, 5B:
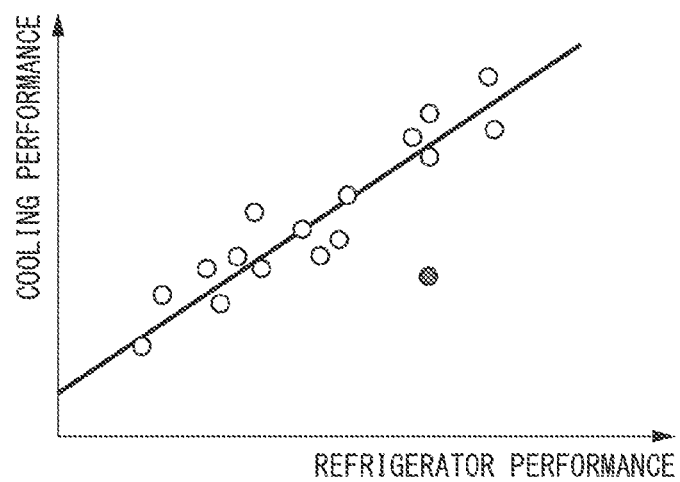
FIG. 5A is a schematic diagram illustrating an example of application development by the application development environment providing system according to the embodiment.
FIG. 5B is a schematic diagram illustrating an example of application development by the application development environment providing system according to the embodiment.

On an analysis screen of the application development environment providing system, the developer analyzes a cooling performance of the six refrigerators using data of two years into the past provided from the historian. A cooling performance Ln can be obtained, for example, using a calculation equation Ln=exhaust temperature/intake air temperature. The developer performs multiple regression analysis on the basis of "refrigerator performance" representing the performance of all the six refrigerators that is a known value and the cooling performance Ln obtained above. Then, for example, a distribution diagram as illustrated in FIG. 5A is displayed on the analysis screen.

Accordingly, the developer can confirm that an original refrigerator performance of the refrigerators and an actual cooling performance do not greatly deviate from each other since measurement points are aligned substantially linearly.

Next, the developer calculates a performance coefficient (for example, Ln) indicating an actual performance of each of the six refrigerators. For example, a value of a performance coefficient for each refrigerator as illustrated in FIG. 5B may be calculated. Using the performance coefficients, for example, the developer may recognize that an actual performance of a specific refrigerator is lower than an original performance. The developer reports a refrigerator of which performance is degraded to the customer using the e-mail transmission and reception function of the application development environment providing system.

Next, the developer develops the application in which the algorithm for automation of the driving control pattern is incorporated, on the basis of the above analysis results. First, on a design screen of the application development environment providing system, the developer disposes development parts indicating the logic model as illustrated in FIG. 4 and connects the development parts to development parts indicating respective input and output data items. The developer displays a logic model creation screen on the display of the application development environment providing system.

Figure 6:
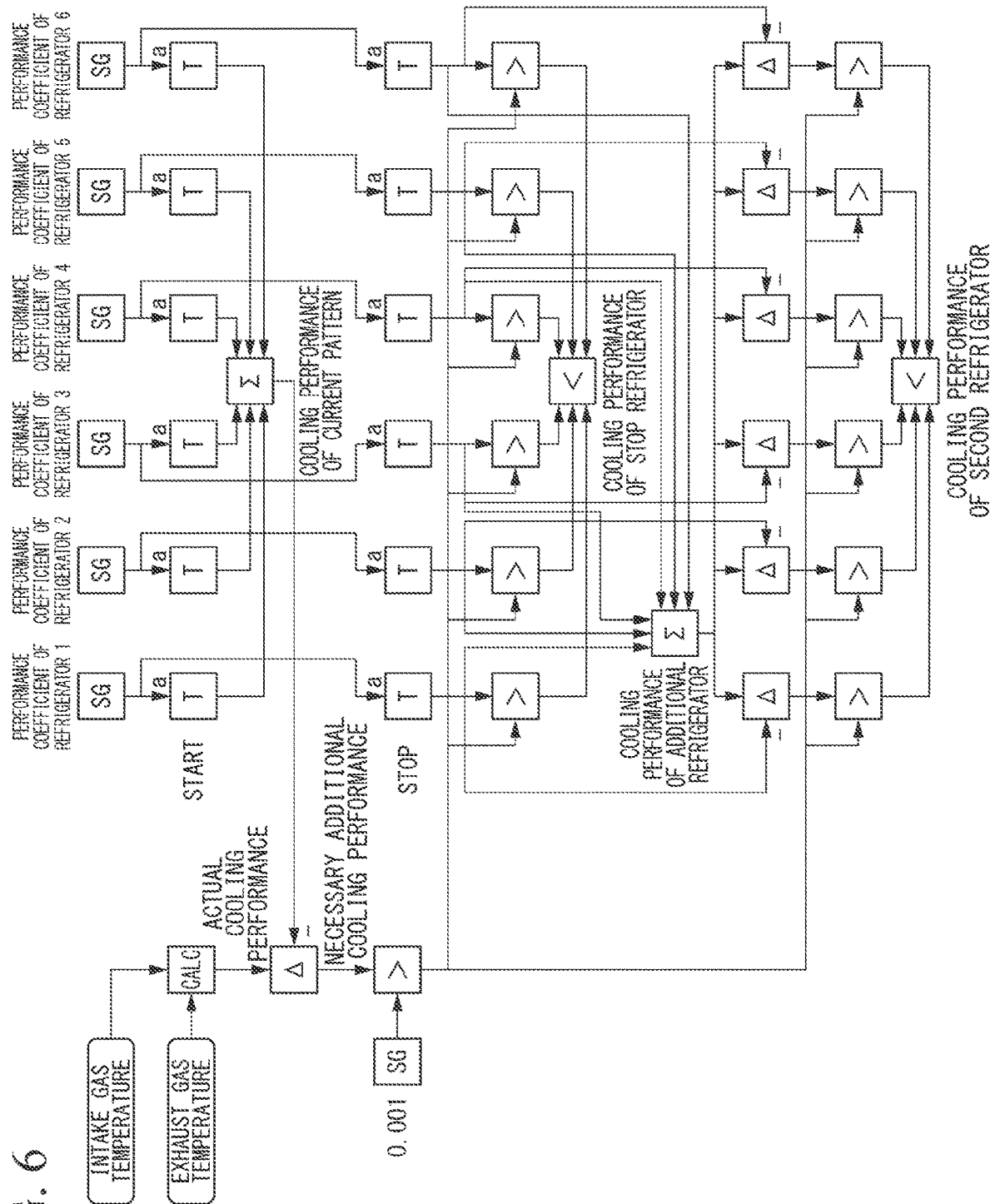
FIG. 6 is a schematic diagram illustrating an example of application development by the application development environment providing system according to the embodiment.

For example, a logic model (algorithm) as illustrated in FIG. 6 is displayed on the logic model creation screen. In the logic model, various coefficients or the like calculated above are also displayed, in addition to the input and output data items. On the logic model creation screen, the developer completes a logic model indicating a logic of a process that is performed by the application. The developer simulates the created logic model using past data acquired from the historian. Using the result of the simulation, for example, the developer can a recognize power consumption or the like that is reduced by controlling the driving of the refrigerator using the created logic model.

Figure 7:
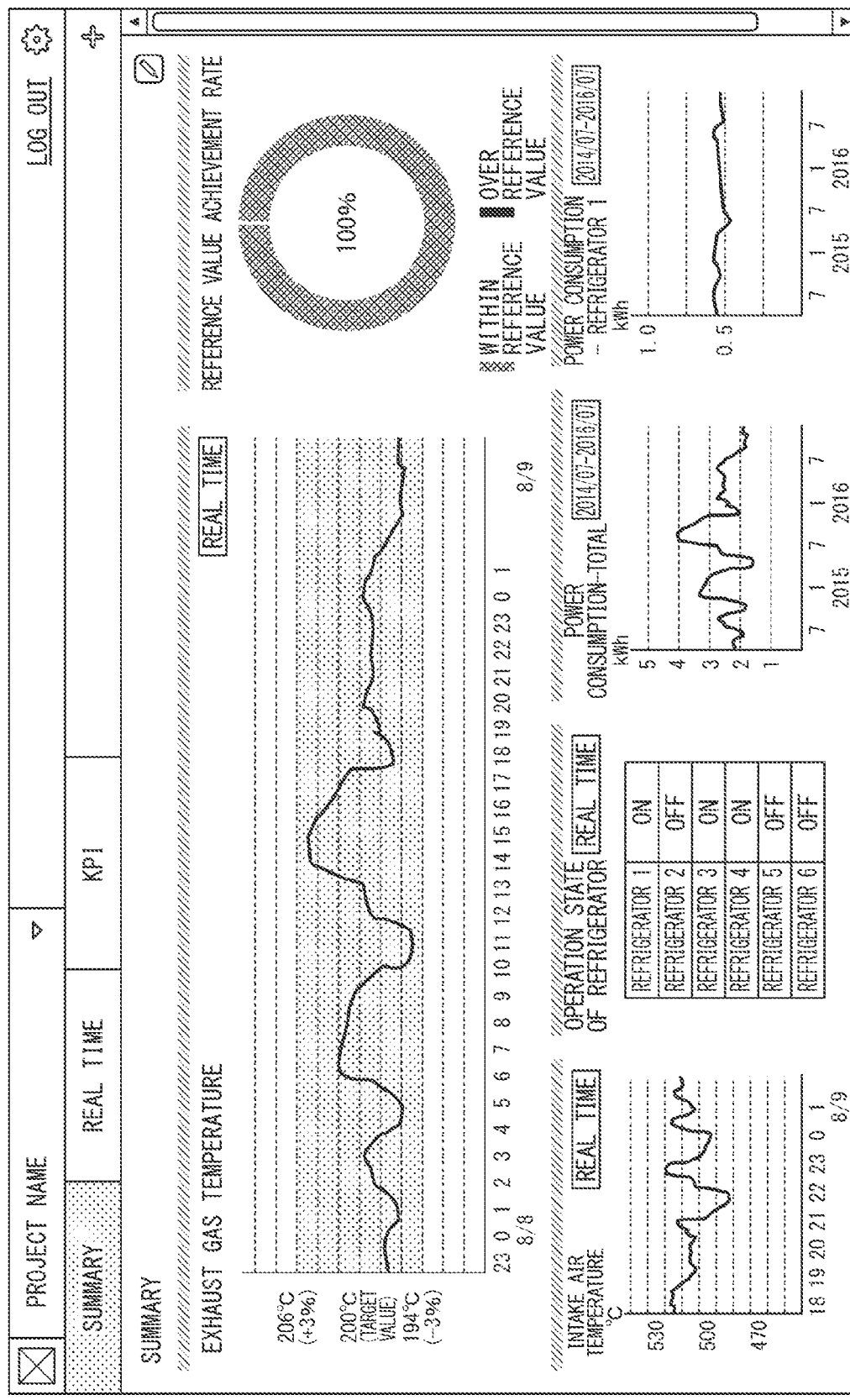
FIG. 7 is a schematic diagram illustrating an example of application development by the application development environment providing system according to the embodiment.

Next, the developer creates a KPI dashboard screen in the application development environment providing system. The KPI dashboard screen is a screen for monitoring an operation situation of the application that controls the operation of the six refrigerators for adjusting the exhaust gas temperature, which has been developed by the above procedure. The KPI dashboard screen is, for example, a screen as illustrated in FIG. 7. As illustrated in FIG. 7, the KPI dashboard screen displays a situation of the exhaust gas temperature in real time using a display of a band shape indicating a range in which an allowable range of variation from a target value is ±3% and a line graph of an achieved value. As illustrated in FIG. 7, the KPI dashboard screen displays, for example, an intake air temperature and an ON/OFF state of the switches of the six refrigerators as reference values in real time. For example, the KPI dashboard displays an alarm when it is detected that the cooling performance of the refrigerator has been degraded. The KPI dashboard is implemented as one function of the application developed by the developer above.

According to a flow of the embodiment described above, the developer performs application development using the application development environment providing system and provides the developed application to the customer.

The application development environment providing system of the present invention may include a construction function unit (not illustrated) that constructs an application program. This construction function unit may prepare, for example, as development parts, respective operations that are performed in plant driving as a process part icon (not illustrated), align the process part icons on the screen according to a desired logic configuration, program configuration, or driving conditions or procedures, or the like, and define the connection conditions of the respective icons, thereby constructing a logic configuration diagram or a work procedure diagram and creating an application program of the work procedure diagram. This construction function unit is configured to enable a user (a driver) to construct an application program easily and intuitively. Hereinafter, a configuration and an operation will be described.

The construction function unit also enables the user to create new icons. A process part icon (not illustrated) represents a logic configuration, a device attribute, or content of a work with a picture. A ready-made program for performing a process of an icon is prepared for the process part icon. The process part icon and the ready-made program are associated with each other.

The construction function unit arranges the process part icons on the screen, connects the icons to each other, defines input and output conditions between the icons at the time of the connection, and sets parameters for the icon corresponding to a logic so that a desired operation is performed. Accordingly, when the construction function unit constructs the logic configuration diagram or the work procedure diagram, the construction function unit accordingly generates information on an order added to icons, connection information of the icons, and the like. The construction function unit constitutes the application program corresponding to the work procedure chart using a ready-made program in which the generated information is associated with the icons.

The application development environment providing system of the present invention may include a driving function unit (not illustrated) that executes an application program created by the construction function unit (for example, performs plant driving).

According to the application development environment providing system of the present invention, starting and stopping of an operation can be performed by a simple operation using a mouse operation in units of process part icons, units of process units, and units of work flows. According to the application development environment providing system of the present invention, it is possible to display various messages for an alarm, guidance, and the like as necessary during driving, and allow progress of safe and reliable driving.

The construction function unit may include an icon storage means, an icon connection means, an information generation means, and a driving execution means, which will be described below.

The icon storage means stores an icon representing each work to be performed in plant driving with a picture and a ready-made program for executing the work of this icon in association with each other. The icon connection means selects icons from the icon storage means, and connects the selected icons on a screen of the displaying means to create a logic configuration diagram or a working procedure diagram showing a logic configuration or a working procedure of the plant driving on the screen.

The information generation means generates information for executing the application program based on the logic configuration or work procedure created by the icon connection means. Examples of the information to be generated include information on an order attached to the icons, and connection information on the icons. The information (execution information) generated by the information generation means is stored in the storage means.

The driving execution means executes the program associated with the information generated by the information generation means and the icon in the work procedure diagram according to the program configuration or the work procedure displayed on the screen (for example, the plant driving is executed and the plant is operated by the driving execution means).

The input means is provided, for example, in order to perform an input operation necessary for plant driving with a mouse, a keyboard, or the like. When the program configuration displayed on the screen or the icon in the work procedure diagram is specified by the input means, the operation executing means may execute work corresponding to the designated icon. Accordingly, it is possible to execute the program directly through a screen operation.

The icon indicating an exception process and the ready-made program for executing the process of this icon may be stored in association with each other in the icon storage means. An icon indicating a normal process and a program thereof are also stored in the icon storage means. In this case, when the exception process is generated, the icon connection means connects the icons stored in the icon storage means on the screen to create a work procedure diagram of the exception process on the screen.

The information generation means may generate information for executing the work procedure of the exception process created by the icon connection means. Information (exception process execution information) generated by the information generation means is stored in the storage means.

The exception process execution means executes the exception process according to the work procedure diagram of the exception process (for example, executes plant driving) on the basis of the program associated with the exception process execution information generated by the information generation means and the icon in the work procedure diagram. The exception process determination means may determine whether or not the exception process is generated.

Details of Embodiments

Hereinafter, embodiments of the present invention will be described in detail with reference to the drawings.

Figure 8:
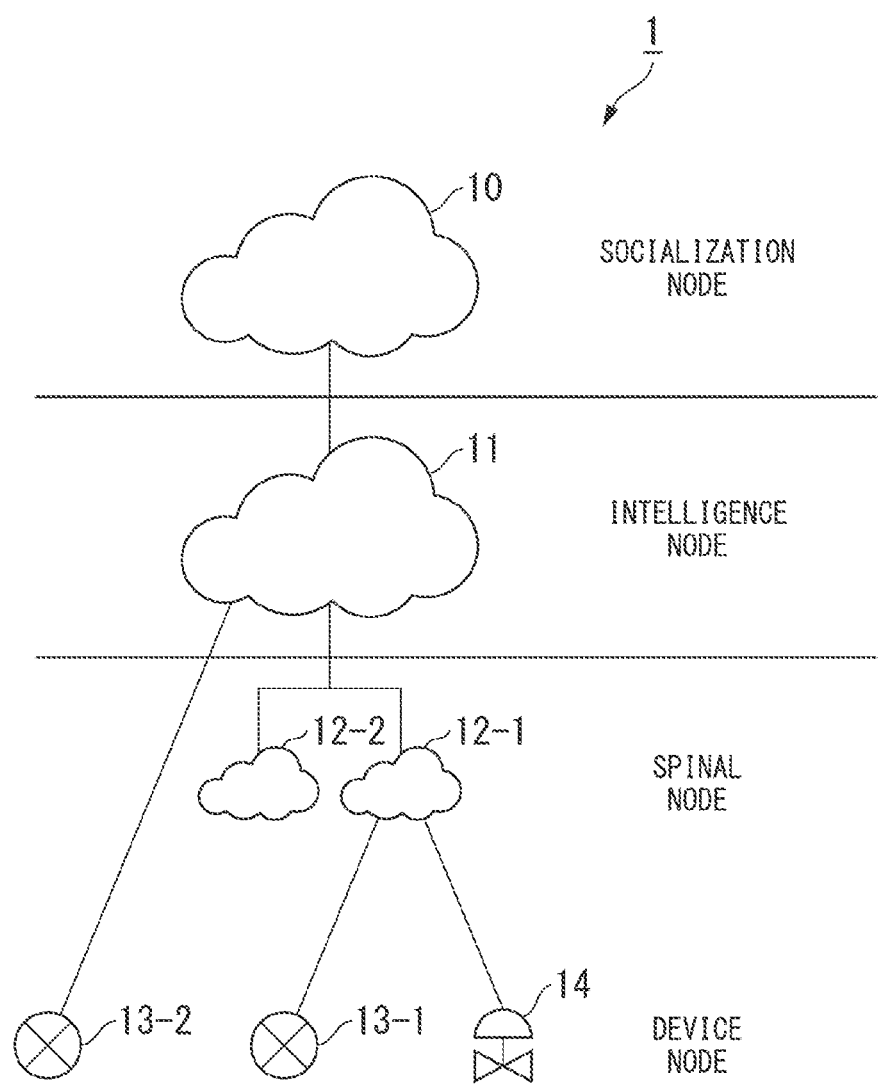
FIG. 8 is a schematic diagram illustrating an overview of the application development environment providing system according to the embodiment of the present invention.

FIG. 8 is a schematic diagram illustrating an overview of the application development environment providing system 1 according to the embodiment of the present invention. As illustrated in FIG. 8, the application development environment providing system 1 is a system configured in a hierarchical structure of four layers including a device node, a spinal node, an intelligence node, and a socialization node in a cloud computing environment.

The device node includes various sensors, various devices, and various systems. Examples of the various sensors include a temperature and humidity sensor, a pressure sensor, and a flow rate sensor. Examples of the various devices include a programmable logic controller (PLC) that is a control device, on-board diagnostics (OBD: self-malfunction diagnosis) device connected to a controller area network-BUS (CAN-BUS: bus type control network) in a vehicle, a key performance indicator (KPI) monitor, a display that displays a current value of a specific sensor, a lamp, a buzzer, a valve, and a robot arm. Examples of the various systems include a DCS, a drone control system, an intrusion detection system, a security system to which an entrance badge reader is connected, and a building automation system to which a lighting, a door lock, an elevator, a sprinkler, or the like is connected.

In the application development environment providing system 1 illustrated in FIG. 8, a device node 13-1 and a device node 13-2 constituted by a sensor, and a device node 14 constituted by an actuator are included on a layer of the device node. Hereinafter, the device node 13-1, the device node 13-2, and the device node 14 may be simply referred to as device nodes 13 and 14 when the device node 13-1, the device node 13-2, and the device node 14 are collectively referred to without being distinguished from each other.

The device nodes 13 and 14 of the application development environment providing system 1 according to the embodiment are constituted by two sensors and one device in order to simplify the description, but the present invention is not limited thereto. The device nodes 13 and 14 can be arbitrarily configured by one or more sensors, devices, systems, and the like. In general, a large number of sensors, devices, systems, and the like may be often accommodated for one spinal node.

Examples of the sensor, the device, the system, and the like constituting the device nodes 13 and 14 include a device that transmit data, a device that receives and displays data, and a device that receives data and causes an action. The sensor, device, system, or the like is, for example, a device compatible with plug-and-play. Further, the sensor, device, system, or the like is, for example, a device having a function of communicating simultaneously with a plurality of applications.

Examples of the device nodes 13 and 14 include a device that communicates with the device constituting the spinal node, a device that is communicatively connected to the device constituting the intelligence node.

Examples of the device nodes 13 and 14 communicatively connected to a device constituting the spinal node include a device that requires real time, a device that is used for an application in which data delay (data communication delay) or fluctuation (variation in a data communication speed), or the like is not permitted, and a device in which there is concern that a communication band is tightened when the device is directly connected to the intelligence node in order to generate a large amount of data.

Meanwhile, examples of the device nodes 13 and 14 communicatively connected to the device constituting the intelligence node include a device that is used for a purpose not affected by delay, fluctuation, or the like, a device that is installed in a remote place, which needs to pass through a wireless communication networks such as a mobile telephone network or a satellite line, and a device to be moved.

The device node 13-1 and the device node 14 are connected to the device constituting the spinal node over the internet via a network interface such as Ethernet (registered trademark) and a plurality of routers or switches. Further, the device node 13-2 is connected to the device constituting the intelligence node over the internet via a network interface such as Ethernet (registered trademark) and a plurality of routers or switches. The device nodes 13 and 14 are communicatively connected to the device constituting the spinal node or the device constituting the intelligence node by Internet Protocol (IP).

The spinal node is constituted by a server device and functions as a gateway. In the application development environment providing system 1 illustrated in FIG. 8, layers of the spinal node include a spinal node 12-1 and a spinal node 12-2. Hereinafter, the spinal node 12-1 and the spinal node 12-2 are collectively referred to as a spinal node 12 when it is not necessary to particularly distinguish between the spinal node 12-1 and the spinal node 12-2.

A server device constituting the spinal node 12 (hereinafter also simply referred to as a spinal node 12) is a server device that accommodates at least one device node 13 or 14 in a cloud computing environment (that is, logically connects the device node, manages the device node, or performs data input and output to and from the device node 1). The spinal node 12-2 originally accommodates at least one device node 13 or 14 like the spinal node 12-1, but description thereof is omitted in FIG. 8 for simplicity of description.

The spinal node 12 is generally a device called a gateway server, a fog computer, an edge computer or the like, for example. The spinal node 12 is installed between a server device (the socialization node 10 and the intelligence node 11 in the embodiment) in a cloud computing environment and a sensor, a device, and a system constituting the device nodes 13 and 14.

The spinal node 12, for example, receives data from the device nodes 13 and 14 that perform communication according to a communication protocol with which the intelligence node 11 cannot perform communication. The spinal node 12 transmits the received data to the intelligence node 11 according to a communication protocol with which the intelligence node 11 can perform communication. Accordingly, the spinal node 12 transfers data from the device nodes 13 and 14 to the intelligence node 11. For example, the spinal node 12 receives a signal transmitted from an analog sensor or the like that cannot perform communication according to an Internet protocol, according to a communication protocol other than the Internet protocol. The spinal node 12 digitally converts the received signal, normalizes the signal, and then transmits the normalized signal to a server device constituting the intelligence node 11 (hereinafter also simply referred to as an "intelligence node 11") through communication based on the Internet protocol. Accordingly, the spinal node 12 transfers data from the device node 13 to the intelligence node 11.

For example, the spinal node 12 receives data transmitted from the device nodes 13 and 14, performs a process such as calculation, interpretation, and determination on the received data, and transmits a result of the process to the intelligence node 13.

The spinal node 12 acquires, for example, data from the device nodes 13 and 14, performs preprocessing on the data, adds a time stamp (a symbol indicating a generation time) to generate time series data, acquires a logic, an algorithm, or the like for processing the time series data from the intelligence node 13, and executes a process (a process such as processing or a determination) for the time series data on the basis of the logic, the algorithm, or the like.

The spinal node 12, for example, transmits the time series data to the intelligence node 11 as necessary or on the basis of an instruction from the intelligence node 11. The spinal node 12 transmits a control signal indicating an action generated on the basis of the time series data and the logic, the algorithm, or the like to the appropriate device nodes 13 and 14.

The spinal node 12 temporarily stores time series data in a time series database (not illustrated) provided in the spinal node 12. At the same time, the spinal node 12 transmits the time series data to the intelligence node 13 in response to a request from the intelligence node 11. Further, the spinal node 12 transmits the time series data temporarily stored in the time series database asynchronously from old data in order to a historian (not illustrated) via a communication route in which security has been secured. Since the historian may be directly connected to the intelligence node 11, the intelligence node 11 can refer to and use the historian as there is the historian in a local environment.

In a case in which the spinal node 12 is constituted by a single piece of hardware, the device nodes 13 and 14 communicatively connected to the spinal node 12 may transmit data to the two or more spinal nodes 12 in parallel in preparation for a case in which a failure or abnormal operation occurs in the spinal node 12. When the device nodes 13 and 14 are devices that perform communication using an Internet protocol, redundancy may be performed by the device nodes 13 and 14 transmitting data, a control signal, and the like to the communication network using a technique such as multicasting or broadcasting, and a plurality of spinal nodes 12 receiving the data, the control signal, and the like in parallel.

The socialization node 10 and the intelligence node 11 include, for example, a server device and a network device that provide a cloud computing environment. The socialization node 10 and the intelligence node 11 may be physically separated by separate devices or may be logically separated in a single device.

A device constituting the socialization node 10 (hereinafter also simply referred to as a "socialization node 10") provides a function of enabling an application development environment or an application execution environment to be shared among a plurality of enterprises (hereinafter also referred to as "tenants") that jointly develop applications, between an enterprise providing applications and enterprise customers that use applications, and between an enterprise and an individual.

A device constituting the intelligence node 11 provides a function for enabling an application development environment or an application execution environment to be shared among organizations (hereinafter also referred to as "sites") such as a plurality of departments or groups that jointly develop applications within an enterprise, and among a plurality of employees (hereinafter also referred to as "accounts").

Hereinafter, an application development environment and an application execution environment in the present invention that can be shared among enterprises, among enterprises and individuals, and among users within enterprises, which are constituted by the intelligence node 10 and socialization node 11, are collectively referred to a co-innovation space.

The socialization node 10 and the intelligence node 11 operate in the server device as described above, and the co-innovation space is implemented in the socialization node 10 and the intelligence node 11. The intelligence node 11 has a main function of the co-innovation space. On the other hand, the socialization node 10 has a function required in a case in which sharing or trading of application programs, communication, and the like are performed between enterprises or between an enterprise and an individual among functions of the co-innovation space.

The intelligence node 11 performs management of the spinal node 12 that is communicatively connected to the intelligence node 11, and management of the device nodes 13 and 14. The user accesses the intelligence node 11 through a human machine interface (HMI) and uses the co-innovation space.

The intelligence node 11 includes various external interfaces for cooperating with various external systems. For example, the intelligence node 11 can cooperate with external IoT and IIoT cloud computing environments, external charging systems, external database systems, and the like. Thus, since the intelligence node 11 can cooperate widely with various external systems, the intelligence node 11 can construct the co-innovation space and an application on the co-innovation space widely cooperating with various external systems in various IoT cloud computing environments.

Since the intelligence node 11 includes the various external interfaces for cooperating with various external systems, the intelligence node 11 can utilize a group of interfaces that are provided by the IoT and IIoT cloud computing environments. Therefore, it is possible to develop solutions for an entire supply chain and an entire life cycle of a business process in a client enterprise.

The co-innovation space is a virtual space in the cloud computing environment, and is a space for application co-innovation that is separated safely from each other, which is separated in units of enterprises (tenants), in units of organizations (sites), or the like.

Using an architecture of the co-innovation space, for example, it is possible to develop applications for performing, for example, consultation, various controls, asset management, remote sensing, remote monitoring, KAIZEN (improvement) activity support using big data, and to develop systems such as an MES or a DCS.

The co-innovation space may also be implemented in a server device of a data center in a local environment, instead of being implemented in a cloud computing environment.

The architecture of the co-innovation space described above may be provided by one or a plurality of devices constituting the intelligence node 11 and the socialization node 10. A storage region in the architecture of the co-innovation space may be a storage of one or a plurality of devices constituting the intelligence node 11 and the socialization node 10 or may be constituted by combining a plurality of some of storage regions of storages included in a plurality of devices.

(Functional Configuration of Co-Innovation Space)

Hereinafter, a functional configuration of the co-innovation space will be described.

Figure 9:
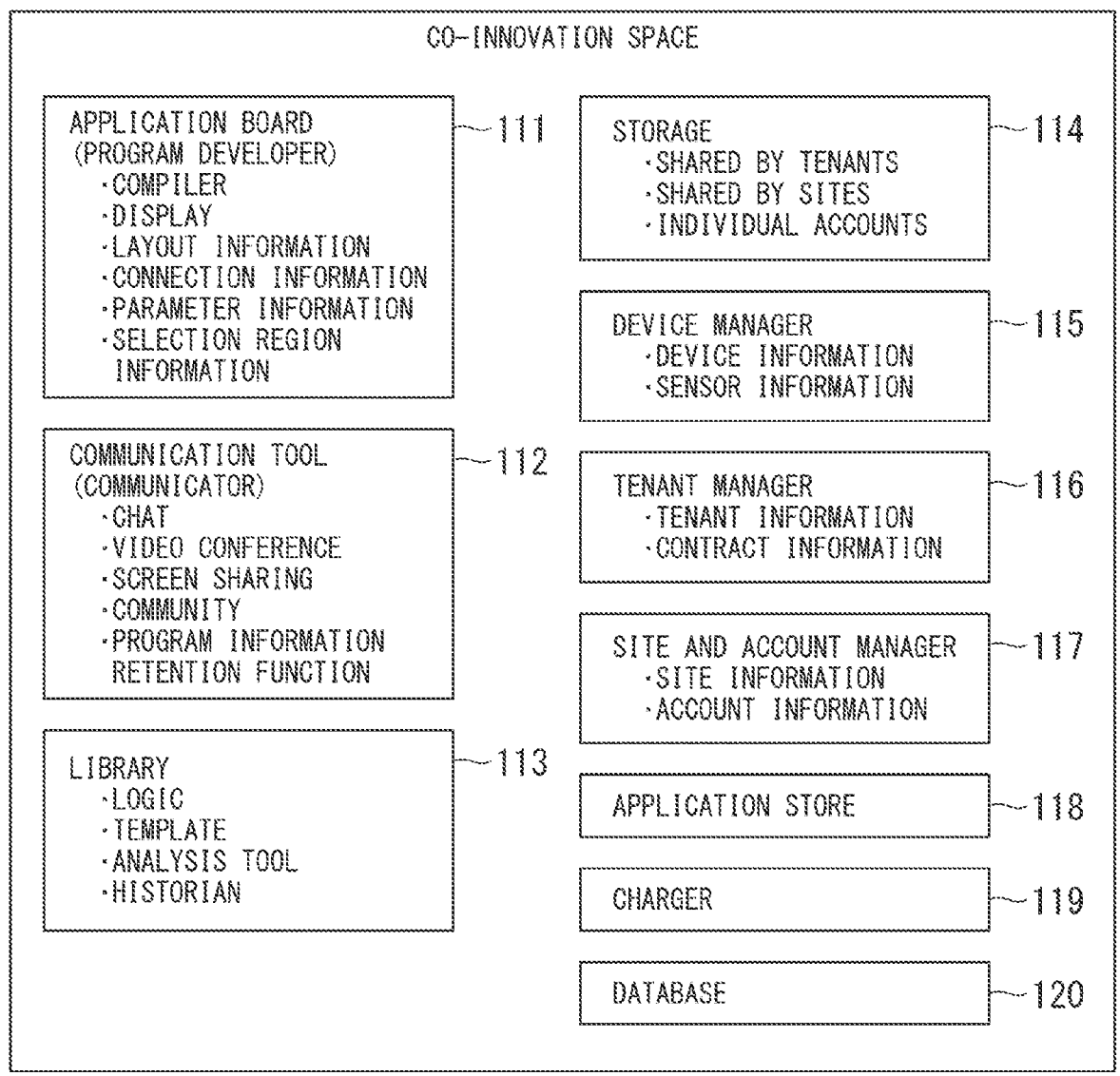
FIG. 9 is a functional configuration diagram of a co-innovation space implemented in the application development environment providing system according to the embodiment of the present invention.

FIG. 9 is a functional configuration diagram of a co-innovation space implemented in the application development environment providing system 1 according to the embodiment of the present invention. As illustrated in FIG. 9, the intelligence node 11 includes an application board 111, a communication tool 112, a library 113, a storage 114, a device manager 115, a tenant manager 116, a site and account manager 117, an application store 118, a charger 119, and a database 120.

The application board 111 (a program developer or a program development display) provides a user with multi-tenant, multi-site, multi-account application development environment, and an application execution environment. The application board 111 has functions such as a compiler, and a display that can visually display an application program to the user. The display displays an image showing the co-innovation space, and visually displays the application program on the basis of layout information, connection information, parameter information, selection region information, and the like in the co-innovation space.

The layout information is information indicating a form of a process of an application program that is a development target. For example, the layout information includes information indicating that the application program that is a development target is an application that performs a multi-input two-output process, or that the application program that is a development target is an application that performs a multi-input multi-output process, or that the application program that is a development target is an application that performs a one-input multi-output process.

The connection information is information on conductors, which is defined when a diagram visually indicating a relationship between data items or logics by connecting input data items, logic serving as content of a process, and output data items serving as results of the process using the conductors in an application program that is a development target is generated.

The parameter information is information indicating setting values of various parameters set in the application program that is a development target.

The selection region information is information indicating a part of a process selected (designated) by an operation or the like of the user among a series of processes of the application program that is a development target. For example, with respect to an application program visually displayed by the application board 111, the user operates a mouse or the like so that a region of part of the application program is surrounded. Accordingly, selected region information indicating the surrounded region is generated.

A user having an account linked to the tenant or the site, for example, can create, manage, and execute the application program using a screen (hereinafter also referred to as a co-innovation space screen) displayed by the display of the application board 111 while sharing data, logics, applications, and the like with other users on the basis of an access authority and an execution authority preset or set by the administrator.

When the user develops the application program, the user selects, for example, necessary development parts from the list of the various development parts (for example, the data item for the input data, the logic that is content of the process, data item for processing result data, and the like described above) in the application board 111. Thereafter, the user drags and drops the selected development parts to the application design region through a mouse operation or the like. Accordingly, the selected development parts are displayed in the application design region. The user performs, for example, a dragging mouse operation or the like so that the selected development parts are connected by a conductor in the application design region. Accordingly, a flow of a process of the application program that is a development target is defined, and the application program is generated.

When the user develops the application program, the user selects necessary application, template, logic, and the like from the list of various general-purpose applications, various general-purpose templates, various general-purpose logics, or the like on the application board 111. Thereafter, the user drags and drops the selected application, template, logic, or the like to the application design region through a mouse operation or the like. Accordingly, the user can develop the application program using the selected application, template, logic, and the like.

The application, template, logic, and the like registered in the list may be either paid or free. In this case, when the user has used the paid application, template, logic, or the like, a charging process is performed by the charger 119 to be described below.

An access authority is set for various types of information (for example, input and output data, information indicating the content displayed on the display, the application program that is a development target, information indicating content of comments exchanged among a plurality of developers in joint development, and information indicating a state of development) used in the application board 111 such that only access from the account belonging to a specific tenant designated in advance or a specified site designated in advance is possible.

Thus, since the co-innovation space has a structure in which various types of information can be shared among users while the access authority being managed, an environment in which the application programs can be safely co-innovated while information leakage or the like being prevented is provided.

The communication tool 112 provides a chat function, a video communication function, a voice communication function, a screen sharing function, a community function such as a bulletin board or a social network service (SNS), and the like, which are used among users. For example, with the chat function, not only text data (for example, source code), image data, an executable file of a program, and the like, but also some or all of application programs that are development target, including setting information such as parameter values, can be transmitted or received and shared between users.

For example, the user can share the application program with another user by dragging and dropping, through a mouse operation or the like, the region indicating the part of the application program selected by surrounding through a mouse operation or the like and pasting the region to a chat screen. For example, when a graph created by data updated in real time is pasted on the chat screen, the graph displayed on the chat screen is also updated in real time. Further, the graph displayed on the chat screen of the co-innovation space referenced by other users is similarly updated in real time.

Thus, according to the co-innovation space, since the application development environment and the communication tool seamlessly cooperate, it is possible to easily and flexibly achieve communication for co-innovation of applications between users.

A community is a function of allowing communication to be achieved among a plurality of users in real time or non-real time. For example, the community is a function such as a bulletin board, a comment list, and an SNS. The access from each user to the community is limited in a range based on an access authority set by a management policy that is set for each tenant. Topics written by the user using the community function may be subjected to narrowing-down search by various narrowing-down conditions (for example, a task, region, industry, and keyword).

Thus, the user, for example, can exchange opinions with a user having an account belonging to the same tenant or site or a user having an account belonging to different tenants or sites using the communication tool 112. Accordingly, it is possible for a plurality of users to co-innovate application programs.

The library 113 provides, for example, generic processing logic, template, analysis tool, and historian (database in which historical information or achievement information is stored) which are used when an application program is developed or executed on the application board 1111.

For example, the library 113 stores various analysis tools, such as a similar waveform search tool, a regression analysis tool, a multiple regression analysis tool, an MT method analysis tool, an error variance analysis tool, a data driven modeling tool, a deep learning tool, and a correlation analysis tool. The user can perform various types of analysis by dragging and dropping an arbitrary analysis tool to the application design region and inputting data The storage 114 divides various types of information (for example, developed application programs or analysis result data) into publicly opened information, tenant shared information, site shared information, and individual account information, and stores the publicly opened information, the tenant shared information, the site shared information, and individual account information in a storage region for public disclosure, a storage region shared by tenants, a storage region shared by sites, or a storage region for individual accounts. The storage region in which each user can store various types of information may be controlled on the basis of the authority set in advance for each user by the administrator of the tenant. The storage 114 may be a storage medium such as a hard disk drive (HDD), a flash memory, an EEPROM, a random access memory (RAM), a read only memory (ROM), or any combination thereof.

The device manager 115 manages information on a sensor, a device, a system, and the like constituting the device nodes 13 and 14 accommodated by the intelligence node 11. For example, the device manager 115 manages information in which the identification information imparted to the device nodes 13 and 14 and the identification information of the account, the site, and the tenant are associated with each other, which are used for accommodation of the device nodes 13 and 14.

The device manager 115 of the intelligence node 11 may acquire and manage the information on a sensor, a device, a system, and the like constituting the device nodes 13 and 14 accommodated by the spinal node 12 via the spinal node 12. Alternatively, the spinal node 12 may manage the information, and the device manager 115 of the intelligence node 11 may acquire the information from the spinal node 12.

The tenant manager 116 manages various types of information on a tenant (enterprise). For example, the tenant manager 116 performs setting, change, deletion, and the like on information such as basic information, billing information, operation authority, and authorization authority of the tenant. For example, the tenant manager 116 manages contract information on a contract related to use of the co-innovation space and use of paid or free applications, tools, templates, data, and the like for each tenant.

The site and account manager 57 manages various types of information on the site (an organization) and the account (a user). For example, the site and account manager 57 performs setting, change, deletion, and the like on information such as basic information of the site and account, billing information, operation authority, and approval authority.

The application store 58 is a function for allowing a user to purchase and sell a part or all of an application program, a logic, a template, data, and the like (hereinafter simply referred to as an application or the like). For example, when the user develops an application program, the user selects an application or the like that the user desires to purchase from the list of applications or the like that is sold by the application store 118 on the co-innovation space screen. The user drags and drops the selected application or the like to the application design region through a mouse operation or the like. Accordingly, the user can purchase the selected application or the like and use the selected application or the like for development of the application programs or the like.

An application or the like sold by the application store 118 may be charged according to an arbitrary charging method such as monthly charge, annual charge, charge according to usage, or one-time charge. A specific application or the like among applications or the like sold by the application store 118 may not be charged since a certain period (for example, one month) from a date on which the user has started using the application is a free trial period.

The charger 119 performs a charging process for a user who has purchased an application or the like sold by the application store 118. The charger 119 may perform a charging process for use of the co-innovation space. A charge destination may be registered in advance for each tenant, site, or account.

When the purchased application or the like is an application or the like registered in the application store 58 by the user, a part of the amount collected by charging the user who has purchased the application or the like may be paid to a user who has registered the application or the like.

The database 120 holds, as a database, data such as production management information, plant driving management information, and quality information necessary for an operation of the application, and provides necessary data according to a request of the application. This database may be, for example, a general SQL database or may be a non-SQL database for a specific purpose. This database may be set for each tenant, site, or account, and the administrator may individually set an access authority according to the content of data. For these databases, an external database outside the co-innovation space may be referred to.

(Example of Display in Application Board)

Hereinafter, an example of a screen (a co-innovation space screen) that is displayed on the display of the application board 111 will be described. FIGS. 10 to 13 are diagrams illustrating an example of a display in the application board of the application development environment providing system according to the embodiment of the present invention.

Figure 10:
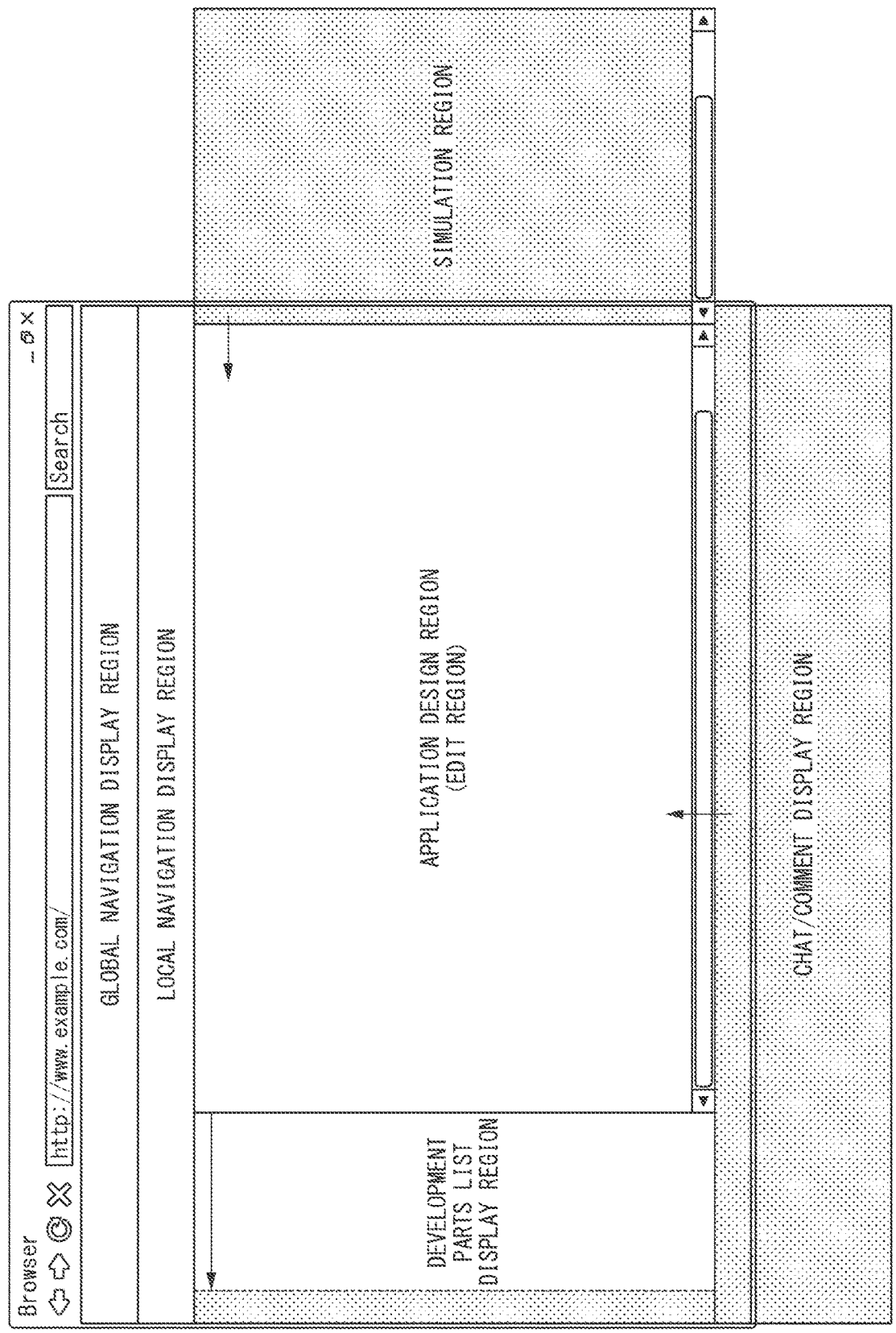
FIG. 10 is a diagram illustrating an example of a display in an application board of the application development environment providing system according to the embodiment of the present invention.

FIG. 10 illustrates an example of a layout of each screen region constituting the co-innovation space screen. As illustrated in FIG. 10, the co-innovation space screen includes four screen regions including an application design region (editing region), a global navigation display region, a local navigation display region, and a development part list display region.

According to an operation of the user, the development parts list display region slides in a left direction of the screen and moves out of the screen, thereby being switched from a displayed state to a non-displayed state. Accordingly, since the application design region is widened, it is easy for the user to perform the work of editing the application program.

In response to an operation of the user, the simulation region and the chat/comment display region which are not displayed at the time of start of the co-innovation space screen are switched to the displayed state. As illustrated in FIG. 10, the simulation region slides from a right direction of the screen and moving into the screen, thereby being switched from the non-displayed state to the displayed state. A chat/comment region slides from a downward direction of the screen and moves into the screen, thereby being switched from the non-displayed state to the displayed state.

Accordingly, the user can cause the simulation region and the chat/comment display region to be displayed on the display only when necessary, and widely secure the application design region by hiding the screen regions when the screen regions are not necessary. Therefore, it is easy for the user to perform the work of editing the application program.

The application design region is a screen region for visually displaying the structure of the application program that is a development target. The user selects, for example, necessary development parts from the development parts displayed in the development parts list display region, such as a list of various analysis elements, various data items for input and output data, logic that is content of a process, various applications, various templates, various logics, various graphs, various analysis tools, and the like. Thereafter, the user can cause the image showing the selected development parts to be displayed in the application design region by dragging and dropping the image to the application design region through a mouse operation or the like.

The user can cause a conductor line linking the two development parts to be displayed in the application design region, for example, by dragging a region between two development parts displayed in the application design region through a mouse operation or the like. By performing such an operation, the user can visually design and edit the application program that is a development target.

The user can select, for example, a region of a part of the application program that is a development target by surrounding the region of the part of the application program which is a development target visually displayed in the application design region through a mouse operation or the like. For example, the user can share the region of the part of the selected application program with other users by dragging and dropping the region of the part of the selected application program through a mouse operation or the like and pasting the region of the part of the selected application program to the chat screen.

The user selects, for example, necessary development parts from a list of a part or all of the application programs displayed in the application store displayed in the global navigation display region, the logic, the templates, the data, and the like. Thereafter, the user can drag and drop the development parts to the application design region through a mouse operation and cause the development parts to be displayed in the application design region. Accordingly, the user can purchase necessary development parts from the application store and immediately use the development parts.

The user selects a region of a part or all of the application program which is a development target visually displayed in the application design region through a mouse operation or the like. Thereafter, the user drags and drops the selected region to the application store displayed in the global navigation display region through a mouse operation or the like. Accordingly, the part or all of the selected application program is registered in the application store, and information (for example, including an icon image or the like) indicating the part or all of the application program is displayed in the application store. Thus, the user can sell, for example, a part or all of the developed application program to other users in the application store.

The global navigation display region is a screen region in which a common menu screen is displayed in a tenant (an enterprise) or a site (an organization). For example, menus for using functions such as login/logout, account setting, project switching, search, and an application store are displayed in the global navigation display region.

The local navigation display region is a screen region on which a menu screen according to an account (user) is displayed. For example, menus for using functions such as object management, task management, version management, and project setting in the application program that is a development target are displayed in the local navigation display region.

The development parts list display region is a screen region in which a list screen of development parts that are used for development of application programs is displayed. For example, various analysis elements, various input and output data items, various general-purpose applications, various general-purpose templates, various general-purpose logics, and various analysis tools (for example, a similar waveform search tool, a regression analysis tool, a multiple regression analysis tool, an MT method analysis tool, an error variance analysis tool, a data driven modeling tool, a deep learning tool, and a correlation analysis tool) described above are categorized and listed in the development parts list display region.

The simulation region is a screen region for displaying setting information for simulatively executing (simulating) application programs displayed in the application design region, information indicating simulation results, and the like.

The chat/comment region is a screen region for displaying a chat screen which is a function for allowing a user to exchange messages in real time or non-real time with respect to an application program or the like that is a development target with other users, or a list of comments or the like recorded in the past by the user or another user. A message or comment displayed in the chat/comment region is selected through a mouse operation of the user or the like. The selected message or comment is posted to an arbitrary position in the application design region through an operation such as drag and drop to the application design region.

Figure 11:
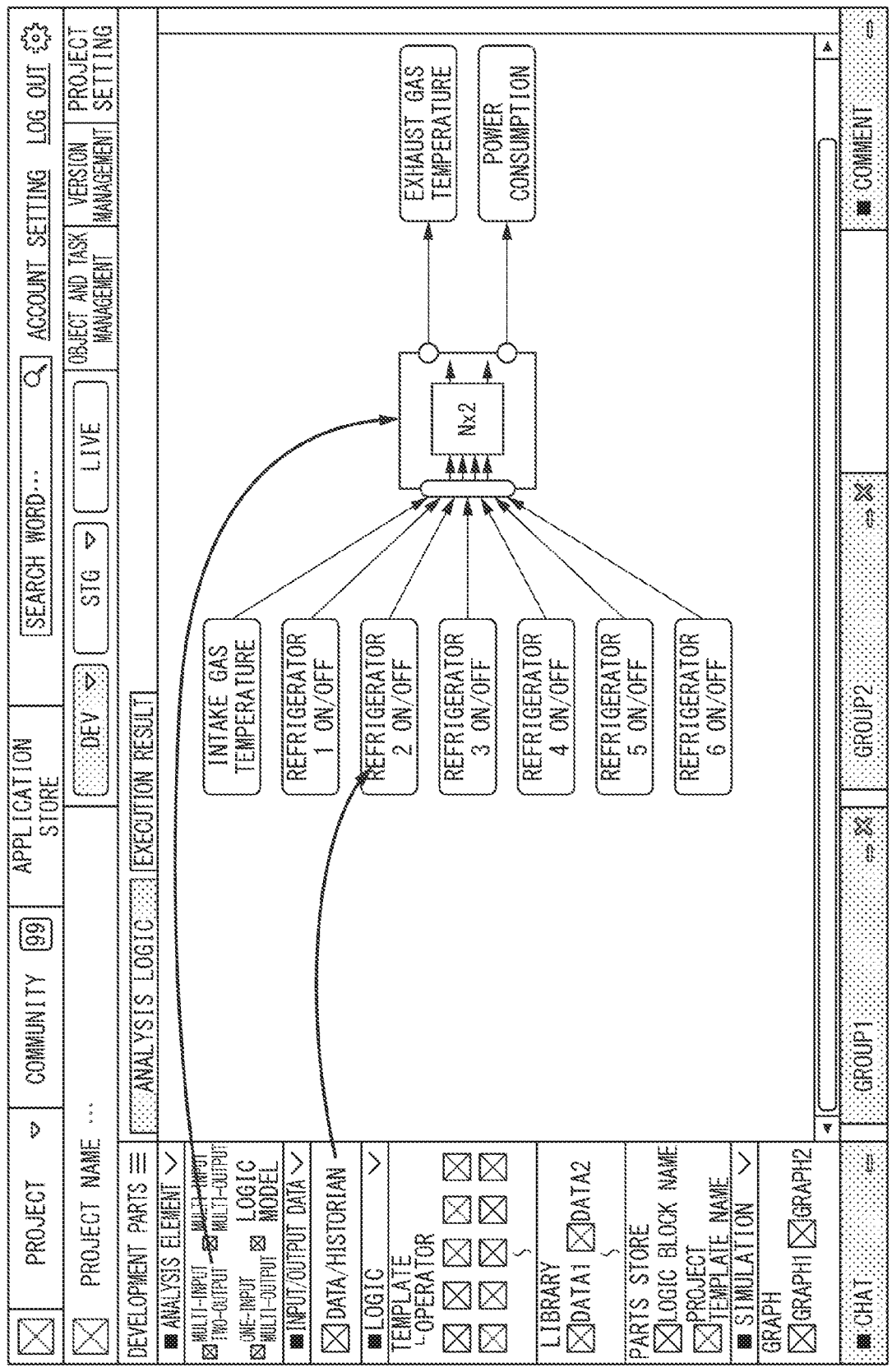
FIG. 11 is a diagram illustrating an example of a display in an application board of the application development environment providing system according to the embodiment of the present invention.

FIG. 11 illustrates an example of a screen when the user selects an arbitrary development part displayed in the development part list display region on the co-innovation space screen and uses the selected development part in the application design region.

As illustrated in FIG. 11, an image visually showing an application program that is a development target, in which seven input data items such as "intake gas temperature", "refrigerator 1 ON/OFF", "refrigerator 2 ON/OFF", "refrigerator 3 ON/OFF", "refrigerator 4 ON/OFF", "refrigerator 5 ON/OFF", and "refrigerator 6 ON/OFF", the analysis element such as "Nx2", and two output data items such as "exhaust gas temperature" and "power consumption" are connected by arrows (conducting lines), is displayed in the application design region.

As illustrated in FIG. 11, a list of development parts classified into categories "analysis element", "input and output data", "logic", and "simulation" is displayed in the development part list display region.

When the user creates an application program in the application design region of FIG. 11, the user first selects a development part "multi-input two-output" from among the development parts in a column "analysis element" displayed in the development part list display region. Thereafter, the user drags and drops the selected development part to the application design region through a mouse operation or the like. Then, an image of an analysis element in which a text "Nx2" representing multi-input two-output is written is displayed in the application design region.

Next, the user selects a development part "data/historian" from the development parts in the column "input and output data" displayed in the development part list display region. Thereafter, the user drags and drops the selected development part to the application design region through a mouse operation or the like. Then, an image showing data/historian is displayed in the application design region.

The user opens a screen (not illustrated) for selecting a data item for the displayed image showing data/historian, and displays a data item list included in the data/historian. When the user selects an input data item "intake gas temperature" from the displayed data item list, a text "intake gas temperature" is displayed in the image showing the historian and the data. Thus, the user can add input data items to the application design region.

Similarly, the user further adds input data items such as "refrigerator 1 ON/OFF", "refrigerator 2 ON/OFF", "refrigerator 3 ON/OFF", "refrigerator 4 ON/OFF", "refrigerator 5 ON/OFF", and "refrigerator 6 ON/OFF" to the application design region.

Next, the user drags a region from the image showing the input data item "intake gas temperature" to the image showing the analysis element "Nx2" through a mouse operation or the like. Then, an image showing an arrow (a conductor) from the image showing the input data item "intake gas temperature" to the image showing the analysis element "Nx2" is displayed. Thus, the user can link the input data item to the analysis element in which the content of the process of the application program is defined.

Similarly, the user further links an image showing the input data items such as "refrigerator 1 ON/OFF", "refrigerator 2 ON/OFF", "refrigerator 3 ON/OFF", "refrigerator 4 ON/OFF", "refrigerator 5 ON/OFF", and "refrigerator 6 ON/OFF" to an image showing the analysis element "Nx2" using arrows (conductive lines). Information indicating a connection from a certain development part to a certain development part is called connection information.

Next, the user adds the output data item to the application design region, similar to the operation when the input data item is added to the application design region in the above. When the user selects the output data item "exhaust gas temperature" from the data item list displayed on a screen (not illustrated) for selection of the data items, a text "exhaust gas temperature" is displayed in the image showing data/historian. Thus, the user can add the output data item to the application design region. Similarly, the user further adds an output data item "power consumption" to the application design region.

Next, the user drags a region from an image showing the analysis element "Nx2" to an image showing the output data item "exhaust gas temperature" though a mouse operation or the like, similar to the operation when the image showing the input data item is linked to the image showing the analysis element in the above. Further, the user drags a region from the image showing the analysis element "Nx2" to the image showing the output data item "exhaust gas temperature" though a mouse operation or the like. Thus, the user can link the output data item to the analysis element in which the content of the process of the application program is defined.

The user displays a screen (not illustrated) defining content of a process to be performed in the analysis element on the display, and defines content of a calculation process that is performed in the analysis element "Nx2". Accordingly, the user can develop an application program for performing a calculation process using data of seven input data items as an input value and outputting data of two output data items as a processing result.

Thus, since the application program that is a development target is visually displayed by the co-innovation space, the user can more intuitively develop applications or the like.

Figure 12:
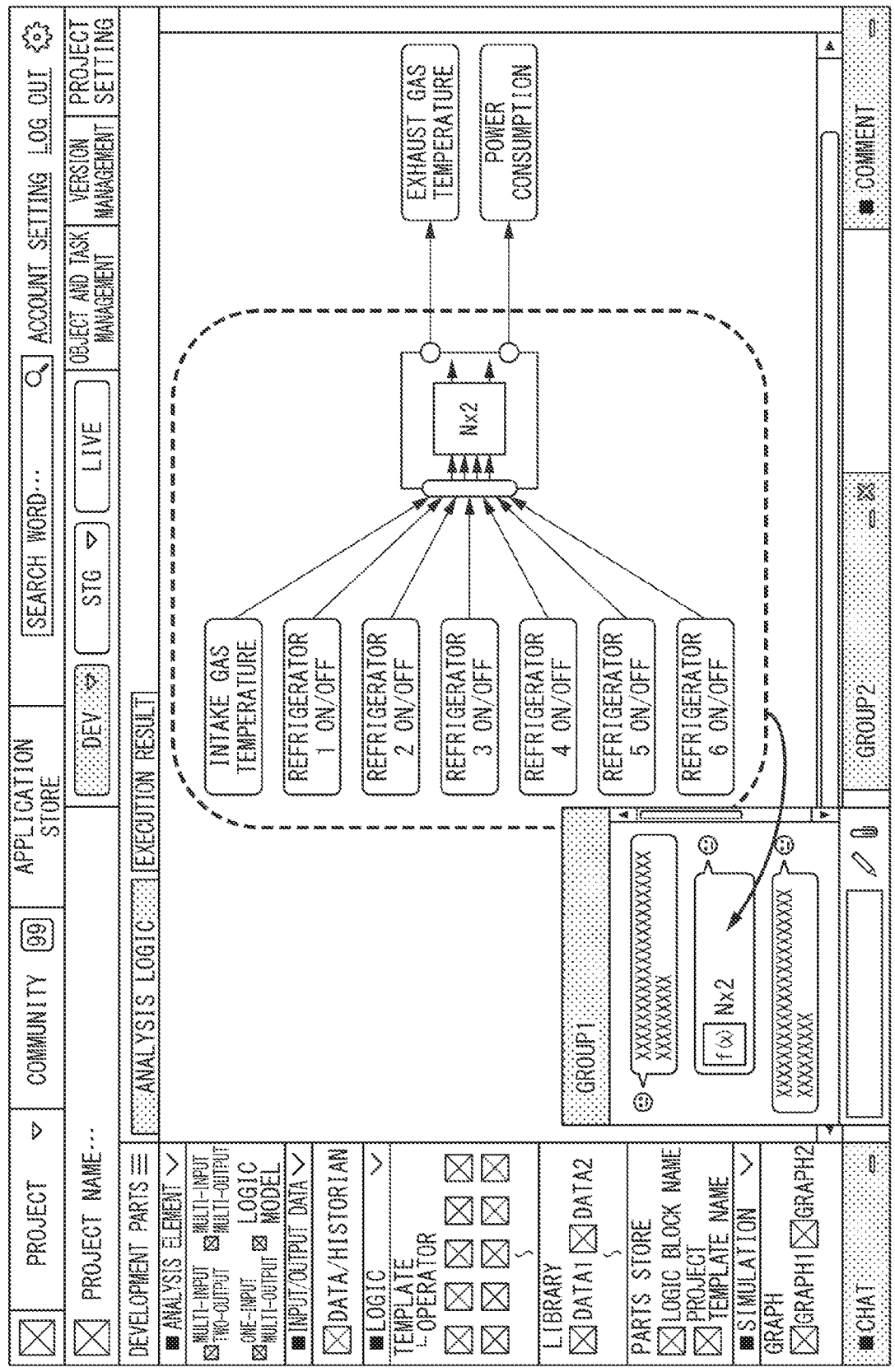
FIG. 12 is a diagram illustrating an example of a display in an application board of the application development environment providing system according to the embodiment of the present invention.

FIG. 12 illustrates an example of a screen when the user selects a region of a part of the application program displayed in the application design region on the co-innovation space screen and shares the selected part of the application program with other users using the chat function.

In the chat/comment display region on the co-innovation space screen illustrated in FIG. 12, a group chat screen on which message exchange is performed by a user belonging to "group 1" is displayed.

Hereinafter, an example in which the user shares a part of the application program displayed in the application design region with another user on the group chat screen will be described. The part of the application program in the example illustrated in FIG. 12 is assumed to be a part corresponding to a range of a process until the data of seven input data items is input and a calculation process is performed.

Among the images of the application program visually displayed in the application design region, the user selects a region by dragging through a mouse operation or the like to surround an image showing seven input data items such as "intake gas temperature", "refrigerator 1 ON/OFF", "refrigerator 2 ON/OFF", "refrigerator 3 ON/OFF", "refrigerator 4 ON/OFF", "refrigerator 5 ON/OFF", and "refrigerator 6 ON/OFF", an image showing the analysis elements of "Nx2", and an image of arrows (conductors) connecting the seven input data items to the analysis elements. Then, as illustrated in FIG. 12, the selected region (that is, a movement trajectory of a pointer or the like by dragging) is displayed by a dotted line in the application design region. In the application program that is a development target, information indicating the selected region is referred to as selected region information.

Next, the user selects a region surrounded by the dotted line in the application design region. Thereafter, the user drags the selected region to the group chat screen of "group 1" through a mouse operation or the like. Then, the information indicating the part of the selected application program is displayed in the message display region of the group chat screen. In the example illustrated in FIG. 12, a notation "Nx2" and an icon are displayed in a message region of the group chat screen of "group 1".

Another user who has received the message through group chat drags and drops the notation "Nx2" or the icon displayed in the message region of the group chat screen from the message region to the application design region through a mouse operation or the like on the co-innovation space screen referred to by the other user. Then, the same image as an image of a range surrounded by the dotted line among the images displayed in the application design region used by the user who is a transmission source of the chat is displayed in the application design region referred to by the other user.

Information shared by the group chat includes not only information indicating the image or layout information, connection information, and selected region information indicating the structure of the application program, but also set parameter values and the like. That is, according to the co-innovation space, the information, including not only source code of the application program but also the set parameter values and the like, can be shared among users.

Thus, the co-innovation space has the application development environment and the communication tool, and the application development environment and the communication tool function in cooperation. Therefore, the user can easily share the developed application and the like with other users.

Figure 13:
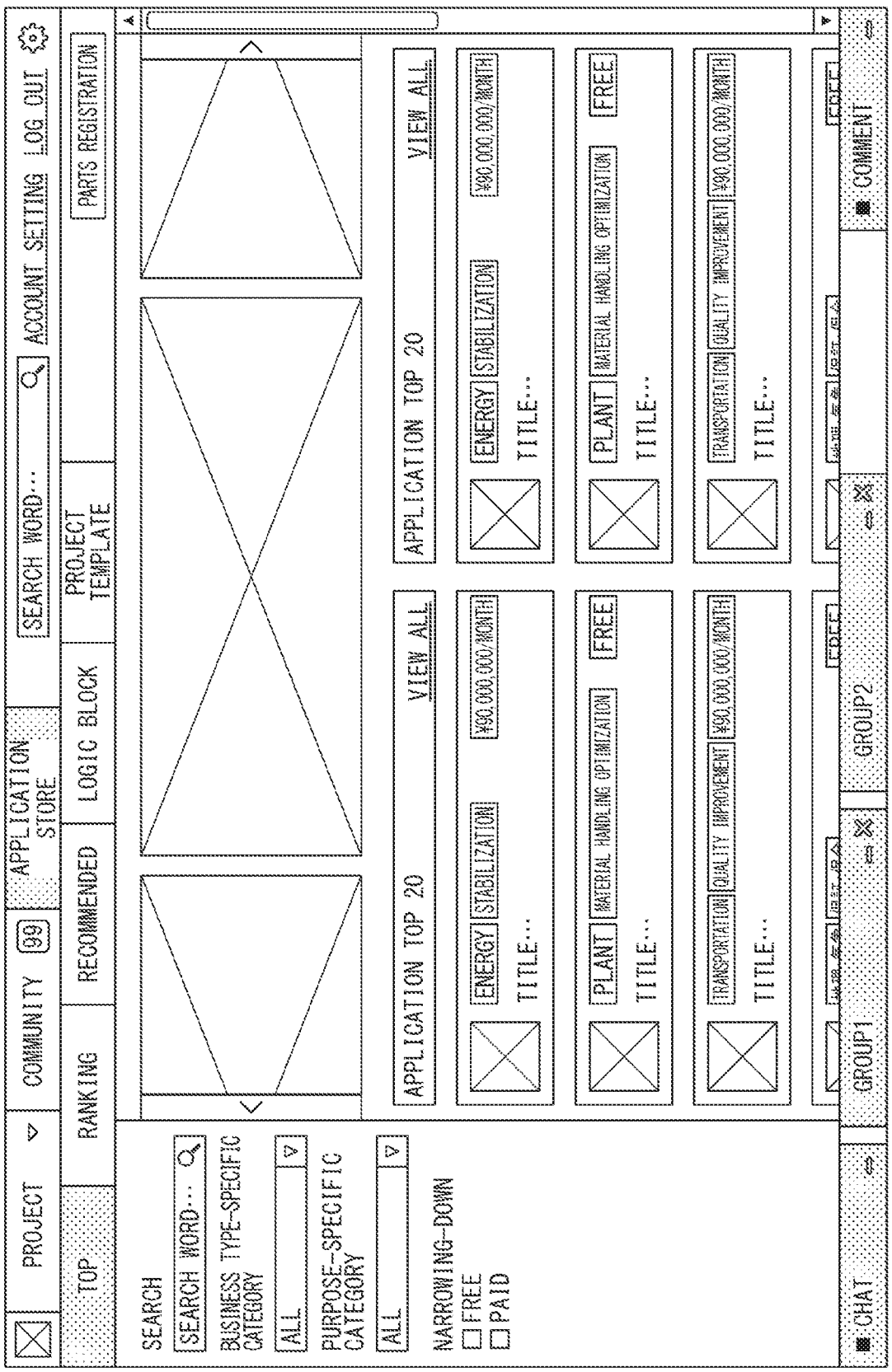
FIG. 13 is a diagram illustrating an example of a display in an application board of the application development environment providing system according to the embodiment of the present invention.

FIG. 13 shows an example of an application store screen. The application store screen is displayed when a display region of an "application store" displayed in the menu displayed in the global navigation region is clicked through a mouse operation or the like.

In the application store, some or all of application programs, logics, templates, data, and the like are sold and purchased. In the application store, top 20 applications (top 20) and templates are displayed in descending order of the purchased number, as illustrated in FIG. 13. In the example illustrated in FIG. 13, a screen region enabling the user to search for a part or all of the application program, logics, templates, data, and the like registered in the application store is displayed in a region on the left side of the application store. In the screen region, the user can perform keyword search, business type-specific category search for performing narrowing-down according to a type of business that is a target of the registered applications or the like, purpose-specific category search for performing narrowing-down according to the purpose of a process that is performed by the registered application or the like, and narrowing-down search for performing narrowing-down on paid or free application or the like.

As described above, the user can register, in the application store, the application programs, logics, templates, or the like developed in the co-innovation space and sell the application programs, logics, templates, or the like to other users.

Thus, the co-innovation space has an application store together with the application development environment. Since the application development environment and the application store function in cooperation, the user can easily sell the developed application or the like to other users or easily purchase the application or the like developed by other users, external vendors, or the like.

(Operation of Co-Innovation Space)

Figure 14:
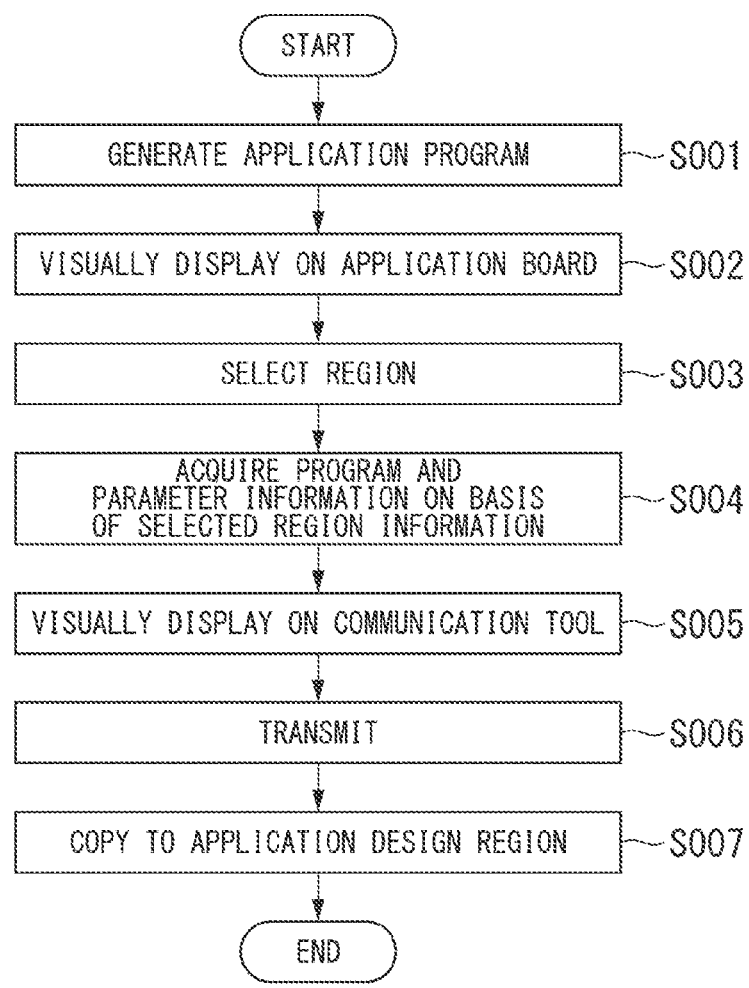
FIG. 14 is a flowchart showing an example of an operation of a co-innovation space implemented in the application development environment providing system according to the embodiment of the present invention.
Figure 15:
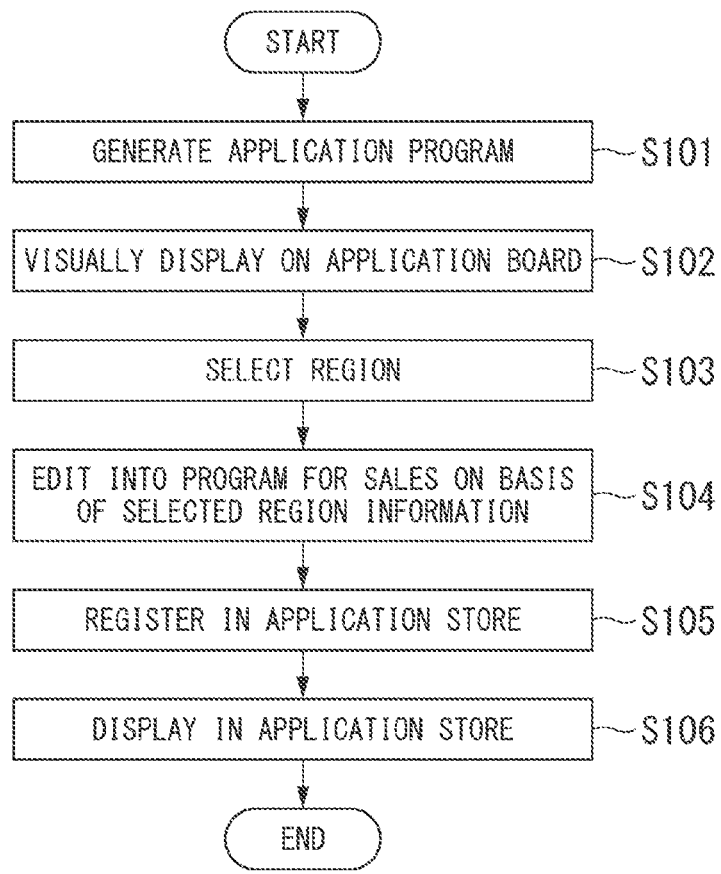
FIG. 15 is a flowchart showing an example of an operation of a co-innovation space implemented in the application development environment providing system according to the embodiment of the present invention.

Hereinafter, an operation of the co-innovation space will be described. FIGS. 14 and 15 are flowcharts showing an example of the operation of the co-innovation space implemented in the application development environment providing system 1 according to the embodiment of the present invention.

FIG. 14 illustrates an operation of the co-innovation space when an application program is generated in the co-innovation space and a part of the generated application program is shared between accounts (users) by the communication tool.

(Step S001) The application board 111 displays a co-innovation space screen on the display. The application board 111 generates an application program according to an operation of the user. The application board 111 generates layout information, connection information, and the like regarding a structure of the generated application program. Thereafter, the process proceeds to step S002.

(Step S002) The application board 111 visually displays the application program generated in step S001 in the application design region of the co-innovation space screen. Thereafter, the process proceeds to step S003.

(Step S003) The application board 111 selects a region of a part of the application program visually displayed in step S002 according to an operation of the user, and generates the selected region information that is information indicating the selected region. Thereafter, the process proceeds to step S004.

(Step S004) The application board 111 acquires the application program and parameter information corresponding to the selected region on the basis of the selected region information generated in step S003. Thereafter, the process proceeds to step S005.

(Step S005) The communication tool 112 visually displays information indicating the part of the application program on the message region of the communication tool 112 on the basis of, for example, the application program, the parameter information, the layout information, the connection information, and the selected region information acquired by the application board 111 in steps S001 to S004 according to an operation of the user (for example, an operation of the user dragging and dropping the region indicating the part of the selected application program to the message display region of the chat screen). Thereafter, the process proceeds to step S006.

(Step S006) The communication tool 112 transmits information indicating the part of the application program to the communication tool of another user according to an operation of the user (for example, an operation for the user clicking on a transmission button on the chat screen) so that the information is visually displayed.

(Step S007) The user receiving the information indicating the part of the application program copies the visually displayed information, for example, the application program, the parameter information, the layout information, the connection information, and the selected region information acquired by the application board 111 in steps S001 to S004 to the application design region according to an operation of the user (for example, an operation of the user dragging and dropping the information visually displayed on the message display region of the chat screen to the application design region). The process of this flowchart ends.

FIG. 15 illustrates an operation of the co-innovation space when an application program is generated in the co-innovation space and a part of the generated application program is registered in the application store for sale.

(Step S101) The application board 111 displays the co-innovation space screen on the display. The application board 111 generates an application program according to an operation of the user. The application board 111 generates layout information, connection information, or the like on the structure of the generated application program. Thereafter, the process proceeds to step 1002.

(Step S102) The application board 111 visually displays the application program generated in step S001 in the application design region of the co-innovation space screen. Thereafter, the process proceeds to step S103.

(Step S103) According to an operation of the user, the application board 111 selects a region of part of the application program visually displayed in step S002, and generates selected region information that is information indicating the selected region.

Thereafter, the process proceeds to step S104.

(Step S104) The application board 111 edits the application program corresponding to the selected region into an application program that can be sold, on the basis of the selected region information generated in step S003. Thereafter, the process proceeds to step S105.

(Step S105) The application store 118 registers, for example, the application program edited in step S104 according to an operation of the user (an operation of dragging the region indicating the part of the application program selected by the user to the display region of the application store in the menu screen displayed in the global navigation display region). Thereafter, the process proceeds to step S106.

(Step S106) The application store 118 displays the application program registered in step S105. The process of this flowchart ends.

As described above, the application development environment providing system 1 according to the embodiment provides a development environment for application programs via a communication network. The application board 111 (a program developer and a program development display) of the application development environment providing system 1 can generate an application program on the basis of an input from a terminal connected to the development environment and visually display the generated application program. The communicator (a communication display) of the application development environment providing system 1 can communicate among a plurality of users who use the development environment, and visually display the part or all of the application program generated by the application board 111 (a program developer and a program development display) on a designated terminal.

Accordingly, the application development environment providing system 1 according to the embodiment can realize efficient development and sharing of application programs that are used in a cloud computing environment.

Although the embodiments of the present invention have been described in detail above, specific configurations are not limited to those described above, and various design changes and the like can be made without departing from the gist of the present invention.

A part or all of the application development environment providing system 1 in the embodiments described above may be realized by a computer. In this case, the part or all of the application development environment providing system 1 may be realized by recording one or more programs for realizing a control function thereof on a computer-readable recording medium, loading one or more programs recorded on the recording medium into a computer system, and executing the programs.

The "computer system" referred to herein is a computer system built in the application development environment providing system 1 and includes an OS or hardware such as peripheral devices. The "computer-readable recording medium" refers to a storage device, such as a portable medium such as a flexible disk, a magneto-optical disc, a ROM, or a CD-ROM, or a hard disk built in the computer system.

Further, the "computer-readable recording medium" may also include a recording medium that dynamically holds a program for a short period of time, such as a communication line when a program is transmitted via a network such as the Internet or a communication line such as a telephone line, or a recording medium that holds a program for a certain period of time, such as a volatile memory inside a computer system serving as a server or a client in such a case. Further, the program may be a program for realizing some of the above-described functions. Further, the program may be a program capable of realizing the above-described functions in combination with a program previously stored in the computer system.

The application development environment providing system 1 in the embodiment described above may be realized as an integrated circuit such as a large scale integration (LSI). Each functional block of the application development environment providing system 1 may be individually implemented as a processor, or a part or all thereof may be integrated into a processor. A scheme of the integration is not limited to the LSI, and the application development environment providing system 1 may be realized by a dedicated circuit or a general purpose processor. When an integrated circuit technology for replacing the LSI emerges due to the advance of a semiconductor technology, an integrated circuit according to the technology may be used.

The terms denoting directions such as "front, back, top, bottom, right, left, vertical, horizontal, bottom, horizontal, row, and column" in the present specification refer to these directions in the device of the present invention. Accordingly, these terms in the specification of the present invention should be construed relatively in the device of the present invention.

The term "configured" is configured to execute the functions of the present invention or is used to indicate a configuration, elements, and parts of a device.

Further, the terms expressed as "means-plus-function" in the claims should include any structure that can be used to execute the functions included in the present invention.

The term "unit" is used to indicate a component, unit, hardware, or a part of software programmed to execute a desired function. Typical examples of the hardware are devices or circuits, but the present invention is not limited thereto.

Although the preferred embodiments of the present invention have been described above, the present invention is not limited to these examples. Additions, omissions, substitutions, and other changes in the configuration are possible without departing from the spirit of the present invention. The present invention is not limited by the foregoing description, but only by the scope of the appended claims.

REFERENCE SIGNS LIST

1 Application development environment providing system
10 Socialization node
11 Intelligence node
12 Spinal node
13 Device node (sensor)
14 Device node
111 Application board (program developer and program development display)
112 Communication tool (communicator or communication display)
113 Library
114 Storage
115 Device manager
116 Tenant manager
117 Site and account manager
118 Application store
119 Charging unit
120 Database

The invention claimed is:

1. An application development environment providing system that provides a development environment for an application program via a network, the application development environment providing system comprising for a first user:
a display device; and
a hardware processor configured to:
generate the application program on the basis of an input from a terminal connected to the development environment;
visually display, on the display device, the generated application program as a connection diagram in which input data items, logic serving as content of a process, and output data items serving as results of the process in the application program are connected;
provide a communication function among a plurality of users who use the development environment;
copy a part of the application program generated in the development environment used by the first user to be available in the development environment used by a second user;
visually display the part of the application program on the display device;
visually display the application program on the basis of layout information, connection information, parameter information, and selection region information,
wherein the layout information is information indicating a form of a process of the application program,
wherein the connection information is information on conductors, which is defined when a diagram visually indicating a relationship between data items or logics by connecting input data items, logic serving as content of the process, and output data items serving as results of the process using the conductors in the application program is generated,
wherein the parameter information is information indicating setting values of various parameters set in the application program,
wherein the selection region information is information indicating the part of the application program selected by the first user, and
wherein the hardware processor further configured to display information indicating the part of the application program selected by the first user in a chat screen used by the first user and the second user.

2. The application development environment providing system according to claim 1,
wherein the hardware processor is configured to copy the part of the application program to be available on the basis of selected region information which represents a selected region of the application program selected in accordance with an operation of a user by the hardware processor, and to visually display the part of the application program on the display device.

3. The application development environment providing system according to claim 1,
wherein the hardware processor is configured to copy the part or all of the application program comprising parameter information set by the hardware processor to be available.

4. The application development environment providing system according to claim 1,
wherein the hardware processor is configured to copy the part or all of the application program displayed by the display device to be available, and to visually display the part or all of the application program on the display device.

5. The application development environment providing system according to claim 4,
wherein the hardware processor is configured to update the displayed application program on the basis of an input from the terminal.

6. The application development environment providing system according to claim 1,
wherein the hardware processor is configured to copy the application program to be available on the basis of at least one of development parts information representing development parts comprising input, calculation, or output, layout information representing an arrangement of the development parts, connection information representing a logical connection between the development parts, and parameter information representing a parameter value set to the development parts, and to visually display the application program on the display device.

7. The application development environment providing system according to claim 1,
wherein the hardware processor is configured to visually move the part or all of the application program generated by the hardware processor in accordance with an operation of dragging and dropping by a user to copy the part or all of the application program to be available in the designated terminal, and to visually display the part or all of the application program on the display device.

8. The application development environment providing system according to claim 1,
wherein the hardware processor is configured to provide the communication function among the plurality of users by a display form in a chat format.

9. The application development environment providing system of claim 1, wherein the output data items can be visually displayed in a chat screen displayed on the display device used by the second user.

10. An application development environment provision method of providing a development environment for an application program via a network, the application development environment provision method being performed by a hardware processor of an application development environment providing system, the application development environment provision method comprising:
generating, by the hardware processor under control of a first user, the application program on the basis of an input from a terminal connected to the development environment;
visually displaying under control of the hardware processor, the generated application program as a connection diagram in which input data items, logic serving as content of a process, and output data items serving as results of the process;
providing, by the hardware processor, a communication function among a plurality of users, including the first user, who use the development environment;
copying, by the hardware processor, a part of the application program generated by the hardware processor in the development environment for availability in the development environment by a second user;
visually displaying, by hardware processor, the part of the application program which has been copied; and
visually displaying, by hardware processor, the application program on the basis of layout information, connection information, parameter information, and selection region information,
wherein the layout information is information indicating a form of a process of the application program,
wherein the connection information is information on conductors, which is defined when a diagram visually indicating a relationship between data items or logics by connecting input data items, logic serving as content of the process, and output data items serving as results of the process using the conductors in the application program is generated,
wherein the parameter information is information indicating setting values of various parameters set in the application program,
wherein the selection region information is information indicating the part of the application program selected by the first user, and
wherein the application development environment provision method further comprises:
displaying, by the hardware processor, information indicating the part of the application program selected by the first user in a chat screen used by the first user and the second user.

11. A terminal device which is communicably connected to a development environment for an application program provided via a network, the terminal device comprising:
a display device; and
a hardware processor configured to:
visually display, on the display device, the application program, generated via the development environment on the basis of an input from the terminal device, as a connection diagram in which input data items, logic serving as content of a process, and output data items serving as results of the process in the application program are connected;
provide a communication function among a plurality of users who use the development environment;
copy a part of the application program generated in the development environment used by a first user to be available in the development environment used by a second user; and
visually display the application program on the basis of layout information, connection information, parameter information, and selection region information,
wherein the layout information is information indicating a form of a process of the application program,
wherein the connection information is information on conductors, which is defined when a diagram visually indicating a relationship between data items or logics by connecting input data items, logic serving as content of the process, and output data items serving as results of the process using the conductors in the application program is generated,
wherein the parameter information is information indicating setting values of various parameters set in the application program,
wherein the selection region information is information indicating the part of the application program selected by the first user, and
wherein the hardware processor further configured to display information indicating the part of the application program selected by the first user in a chat screen used by the first user and the second user.

12. The terminal device according to claim 11,
wherein the communication display is configured to visually display the part of the application program on the basis of selected region information which represents a selected region of the application program selected in accordance with an operation of a user via the program development display.

13. The terminal device according to claim 11,
wherein the communication display is configured to visually display the part or all of the application program comprising parameter information set via the program development display.

14. The terminal device according to claim 11,
wherein the program development display is configured to visually display the part or all of the application program displayed by the communication display.

15. The terminal device according to claim 14,
wherein if the displayed application program has been updated on the basis of an input from the terminal device, the program development display is configured to visually display the updated application program.

16. The terminal device according to claim 11,
wherein the program development display is configured to visually display the application program on the basis of at least one of development parts information representing development parts comprising input, calculation, or output, layout information representing an arrangement of the development parts, connection information representing a logical connection between the development parts, and parameter information representing a parameter value set to the development parts.

17. The terminal device according to claim 11,
wherein the communication display is configured to visually move the part or all of the application program displayed by the program development display from the program development display to the communication display in accordance with an operation of dragging and dropping by a user to visually display the part or all of the application program in the designated terminal.

18. The terminal device according to claim 11,
wherein the communication display is configured to display communication contents among the plurality of users by a display form in a chat format.

19. An application display method performed by a hardware processor of a terminal device communicably connected to a development environment for an application program provided via a network, the application display method comprising:
visually displaying, by a display device under control of the hardware processor, the application program generated via the development environment as a connection diagram in which input data items, logic serving as content of a process, and output data items serving as results of the process on the basis of an input from the terminal device;
providing, by the hardware processor, a communication function among a plurality of users who use the development environment;
copying, by the hardware processor, a part of the application program generated in the development environment used by a first user to be available in the development environment used by a second user; and
visually displaying, by the hardware processor, the application program on the basis of layout information, connection information, parameter information, and selection region information,
wherein the layout information is information indicating a form of a process of the application program,
wherein the connection information is information on conductors, which is defined when a diagram visually indicating a relationship between data items or logics by connecting input data items, logic serving as content of the process, and output data items serving as results of the process using the conductors in the application program is generated,
wherein the parameter information is information indicating setting values of various parameters set in the application program,
wherein the selection region information is information indicating the part of the application program selected by the first user, and
wherein the application display method further comprises:
displaying, by the hardware processor, information indicating the part of the application program selected by the first user in a chat screen used by the first user and the second user.

* * * * *